United States Patent
Kameyama et al.

(10) Patent No.: US 8,510,486 B2
(45) Date of Patent: Aug. 13, 2013

(54) DATA TRANSFER DEVICE AND DATA TRANSFER METHOD

(75) Inventors: Hiroaki Kameyama, Kawasaki (JP); Yuichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 920 days.

(21) Appl. No.: 12/622,872

(22) Filed: Nov. 20, 2009

(65) Prior Publication Data

US 2010/0095108 A1 Apr. 15, 2010

(30) Foreign Application Priority Data

Oct. 12, 2008 (JP) .................. 2008-314642

(51) Int. Cl.
*G06F 13/12* (2006.01)
*G06F 13/38* (2006.01)

(52) U.S. Cl.
USPC ........................................ 710/68; 348/14.13

(58) Field of Classification Search
None
See application file for complete search history.

(56) References Cited

U.S. PATENT DOCUMENTS

| 7,082,165 | B2 | 7/2006 | Uenoyama et al. |
| 7,106,909 | B2 * | 9/2006 | Satoh et al. .................... 382/239 |
| 7,295,712 | B2 * | 11/2007 | Hattori .......................... 382/232 |
| 7,881,373 | B2 * | 2/2011 | Mihara et al. ............. 375/240.04 |
| 2003/0184813 | A1 * | 10/2003 | Kobayashi et al. ...... 358/426.01 |

FOREIGN PATENT DOCUMENTS

| JP | 10-136189 | 5/1998 |
| JP | 2002-112257 | 4/2002 |
| JP | 2007-28646 | 2/2007 |
| JP | 2008-160535 | 7/2008 |

OTHER PUBLICATIONS

Japanese Office Action issued Jun. 19, 2012 in corresponding Japanese Patent Application No. 2008-314642.

* cited by examiner

*Primary Examiner* — Elias Mamo
(74) *Attorney, Agent, or Firm* — Staas & Halsey LLP

(57) ABSTRACT

A data transfer device and method include obtaining a compression ratio and a compression speed of data for each of a plurality of compression levels, obtaining a compression ratio of data for each of the compression levels, adding a predicted time required for the compression and a predicted time required for the transfer of the data for each of the compression levels to determine a compression level for which the added predicted time is shortest, compressing the data to be transferred at the determined compression level and transferring the compressed to a transfer destination.

9 Claims, 20 Drawing Sheets

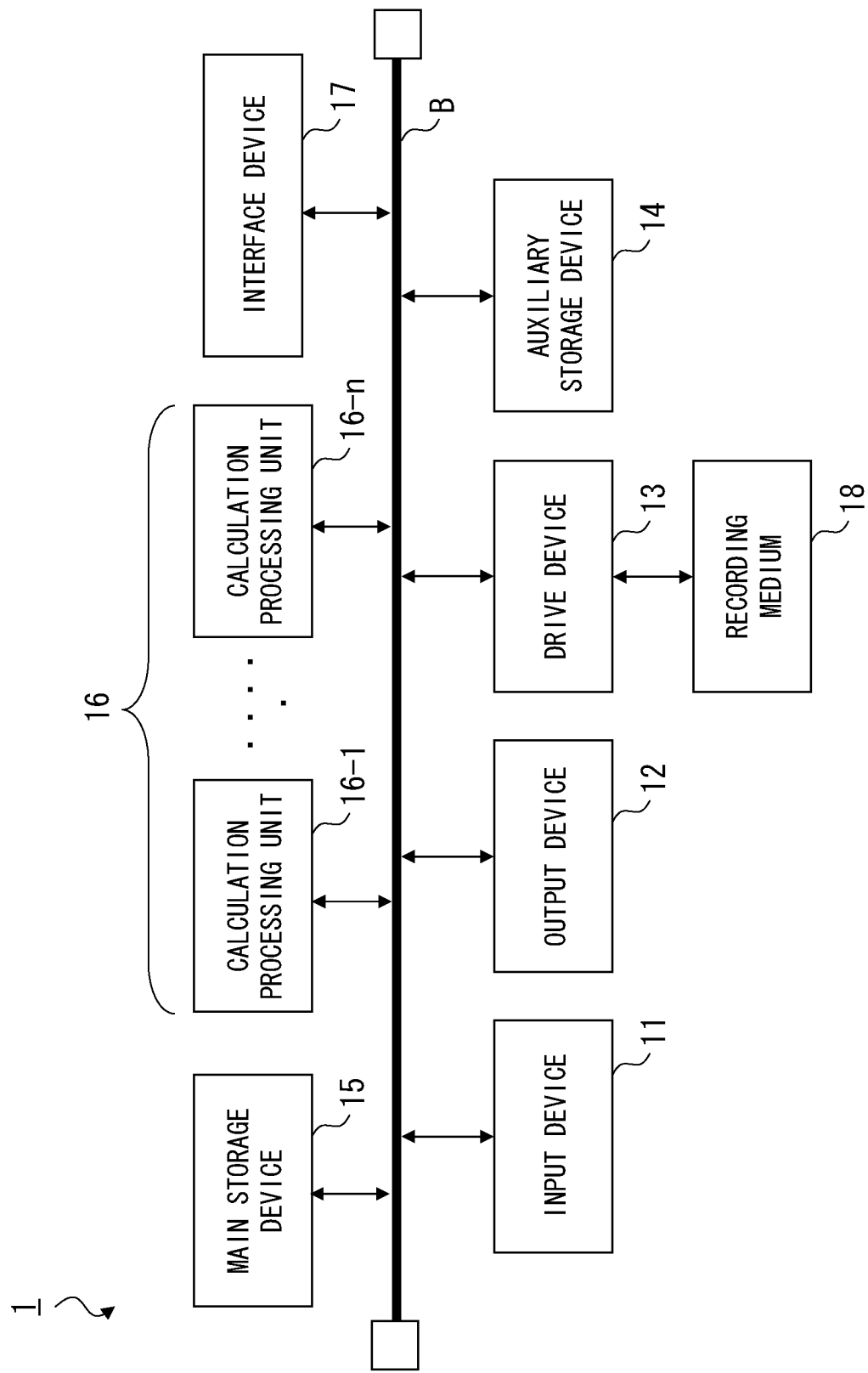

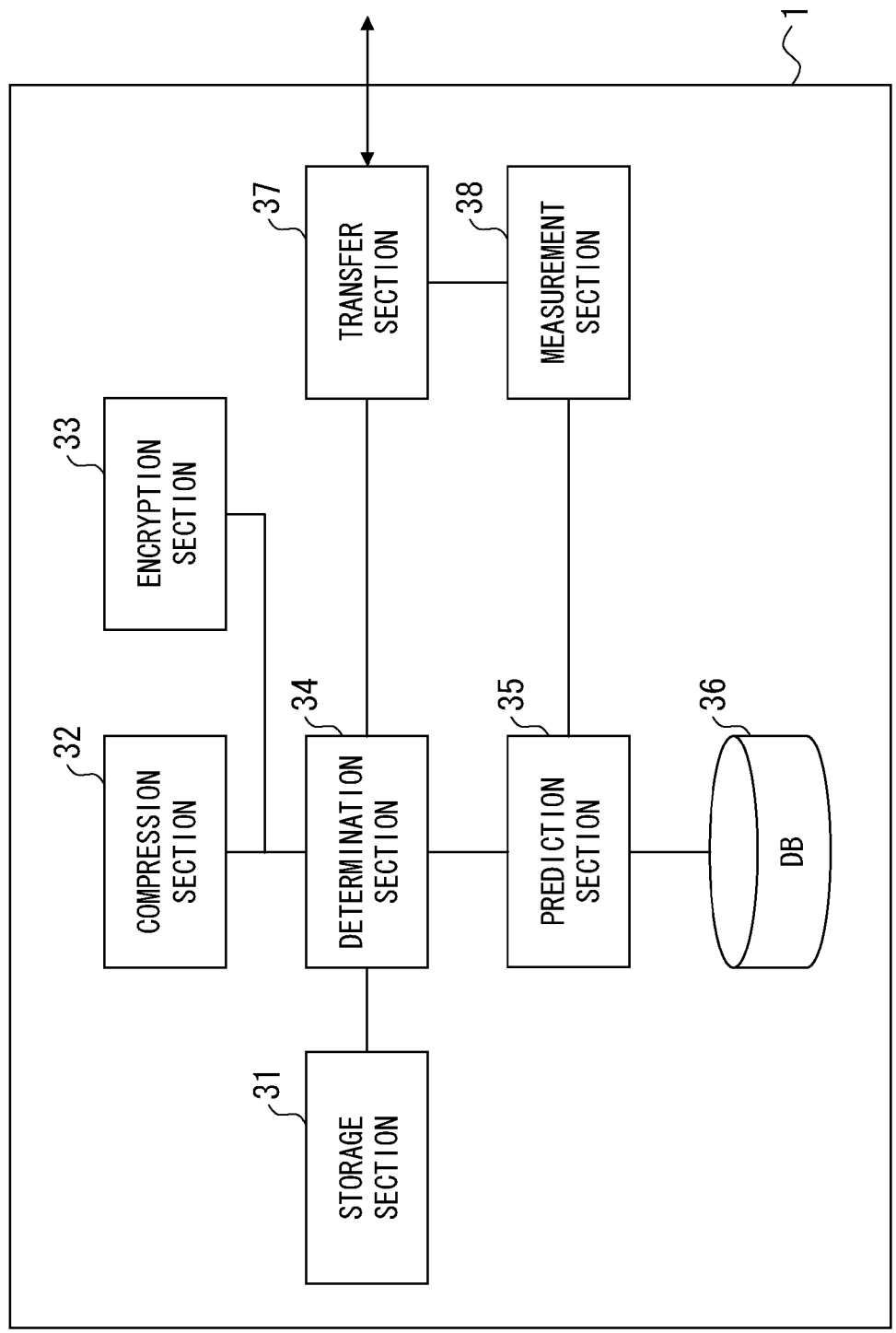

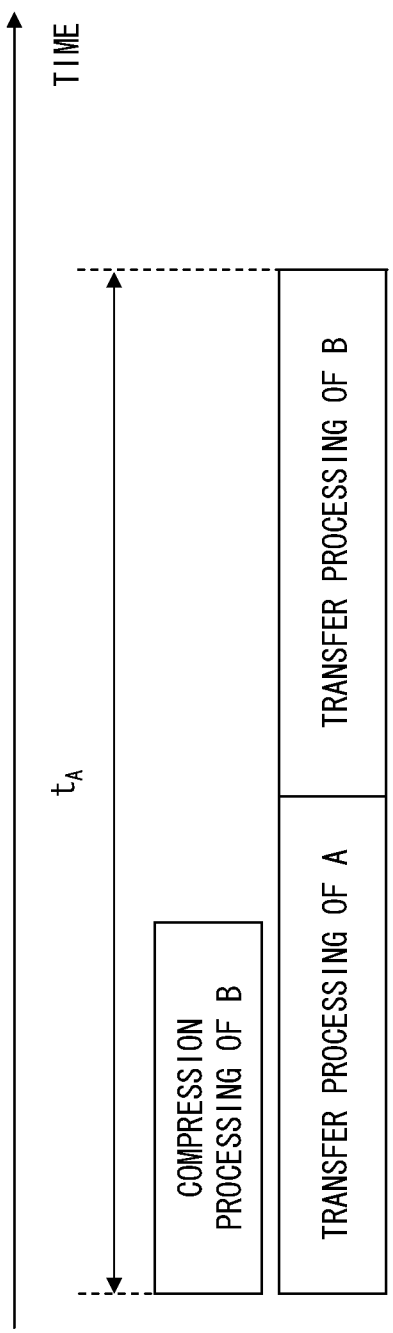
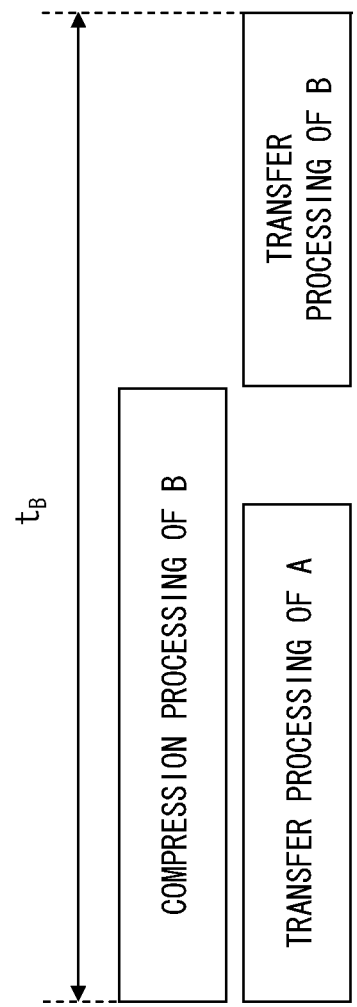
FIG. 4A
FIG. 4B

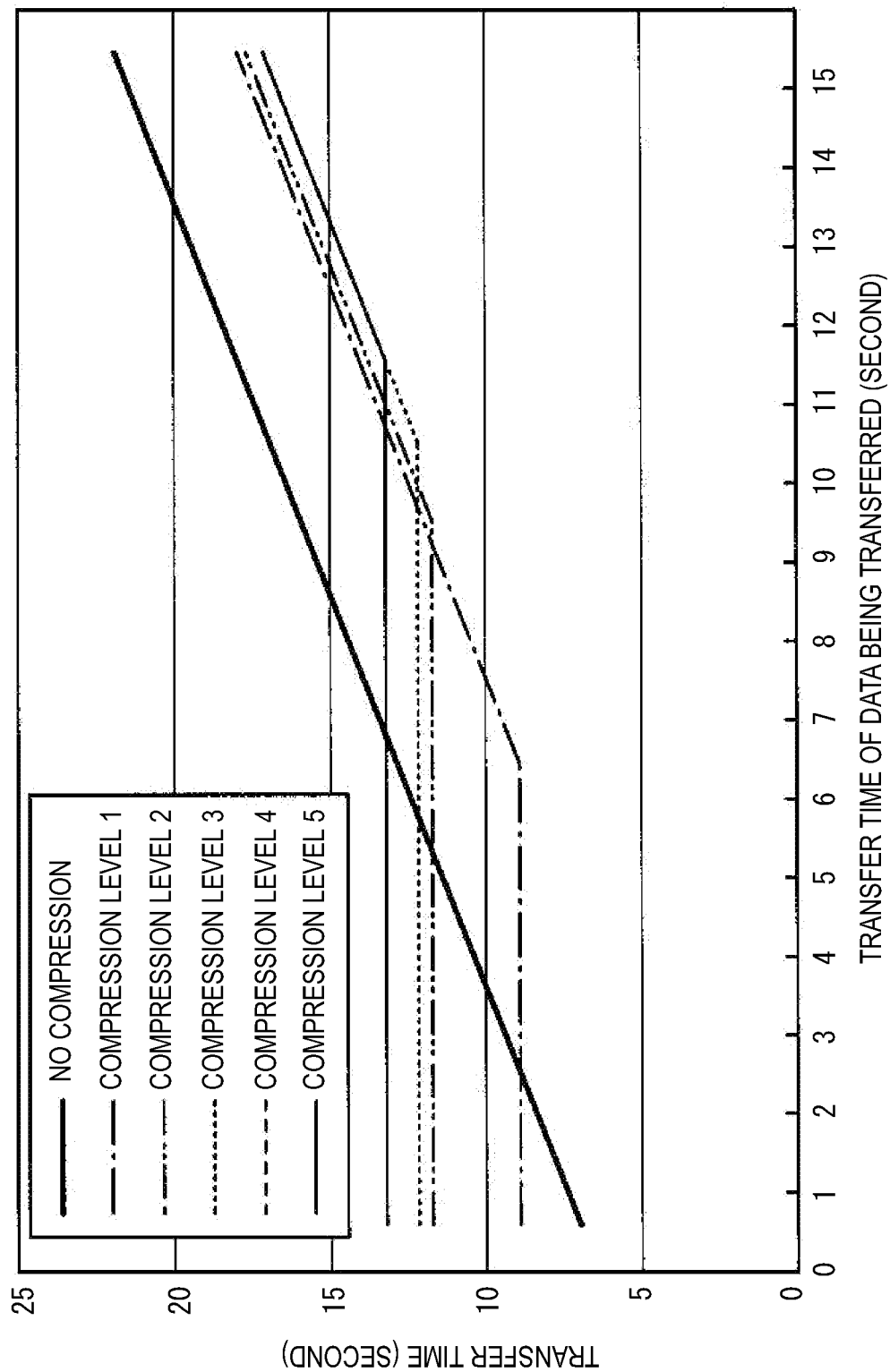

FIG. 6

|  | BEFORE COMPRESSION | AFTER COMPRESSION |
|---|---|---|
| FILE A | 30.2MB | 28.0MB |
| FILE B | 17.3MB | 8.7MB |
| FILE C | 3.9MB | 2.0MB |

FIG. 7

|  | THE NUMBER OF PROCESSORS = 1 | THE NUMBER OF PROCESSORS = 2 |
|---|---|---|
| COMPRESSION LEVEL = 1 | 7 SECONDS | 6 SECONDS |
| COMPRESSION LEVEL = 2 | 11 SECONDS | 9 SECONDS |
| COMPRESSION LEVEL = 3 | 17 SECONDS | 10 SECONDS |
| COMPRESSION LEVEL = 4 | 18 SECONDS | 11 SECONDS |
| COMPRESSION LEVEL = 5 | 20 SECONDS | 11 SECONDS |

FIG. 13

| TYPE | COMPRESSION LEVEL | COMPRESSION SPEED, THE NUMBER OF PROCESSORS = 1 | ... | COMPRESSION SPEED, THE NUMBER OF PROCESSORS = N | COMPRESSION RATIO |
|---|---|---|---|---|---|
| PPT | 1 | 5.1Mbps | ... | 7.1Mbps | 93% |
| PPT | 2 | 4.3Mbps | ... | 6.3Mbps | 92% |
| BMP | 1 | 6.8Mbps | ... | 8.8Mbps | 54% |
| BMP | 2 | 5.4Mbps | ... | 7.4Mbps | 52% |
| ... | ... | ... | ... | ... | ... |

FIG. 15

| TYPE | COMPRESSION LEVEL | COMPRESSION SPEED, THE NUMBER OF PROCESSORS = 1 | ... | COMPRESSION SPEED, THE NUMBER OF PROCESSORS = N | COMPRESSION RATIO | COMPRESSION ENCRYPTION SPEED, THE NUMBER OF PROCESSORS = 1 | ... | ENCRYPTION SPEED, THE NUMBER OF PROCESSORS = N |
|---|---|---|---|---|---|---|---|---|
| PPT | 1 | 5.1Mbps | ... | 7.1Mbps | 93% | 4.3Mbps | ... | 4.3Mbps |
| PPT | 2 | 4.3Mbps | ... | 6.3Mbps | 92% | 4.3Mbps | ... | 4.3Mbps |
| BMP | 1 | 6.8Mbps | ... | 8.8Mbps | 54% | 4.3Mbps | ... | 4.3Mbps |
| BMP | 2 | 5.4Mbps | ... | 7.4Mbps | 52% | 4.3Mbps | ... | 4.3Mbps |
| ... | ... | ... | ... | ... | ... | ... | ... | ... |

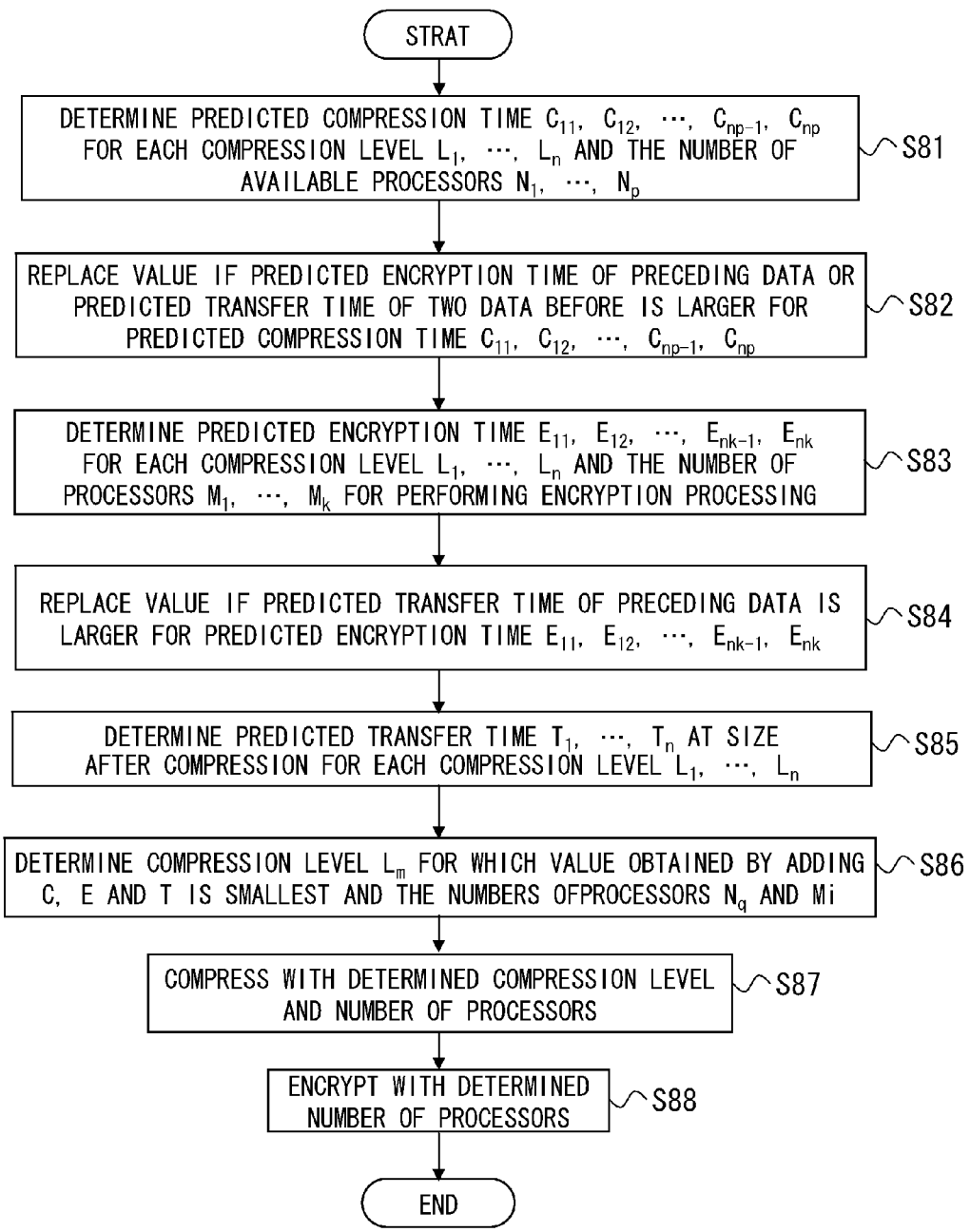

DATA TRANSFER DEVICE AND DATA TRANSFER METHOD

CROSS-REFERENCE TO RELATED APPLICATIONS

This application is based upon and claims the benefit of priority of the prior Japanese Patent Application No. 2008-314642, filed on Dec. 10, 2008, the entire contents of which are incorporated herein by reference.

BACKGROUND

1. Field

Various embodiments described herein relate to a data transfer device, a data transfer method and a data transfer program embodied in a computer readable medium.

2. Description of the Related Art

As a method for transferring a large volume of data at high speed, a typical method is directed to compressing data before transfer. Although the size of data after compression varies depending on the types of data, data compression allows data such as text data and CAD (computer-aided design) data to be compressed to a size of about one-tenth. Therefore, by simple math, the method of compressing data before transfer may increase the transfer rate by a factor of ten.

A user specifies an allowable standby time so as to perform compression that is executable within the time, thus increasing efficiency of compression and transfer (Japanese Patent Application Laid-Open No. 2007-028646). In addition, predicting the time required to transfer data after compression, and, if it is longer than a set time, asking for the decision as to whether to perform or abort the transfer. A characteristic of the prior art described above is that data may be reduced by increasing the degree of compression considerably due to the type of the target data being an image or video. (Japanese Patent Application Laid-Open No. 10-136189).

Further, transfer processing and compression processing of data are performed simultaneously, thus achieving acceleration of the transfer, or the compression processing and transfer processing are controlled to have almost the same processing time, thus achieving an efficient transfer. (Japanese Patent Application Laid-Open No. 2002-112257).

SUMMARY

In accordance with an aspect of embodiments, a data transfer device and method are provided. The data transfer device includes a predicted compression time calculation unit that obtains from a compression information database having a compression ratio and a compression speed of data for each of a plurality of compression levels, a compression speed of the data for each of the compression levels, to calculate based on the compression speed of the data for each of the compression levels, a predicted time required for the compression of the data to be transferred for each of the compression levels.

The data transfer device includes a predicted transfer time calculation unit that obtains from the compression information database, the compression ratio of the data for each of the compression levels, to calculate based on the compression ratio of the data for each of the compression levels, a predicted size after compression of the data to be transferred for each of the compression levels, and calculate a predicted time required for the transfer of the data to be transferred for each of the compression levels, a compression level determination unit that adds the predicted time required for the compression and the predicted time required for the transfer of the data to be transferred for each of the compression levels to determine a compression level for which the added predicted time is shortest, a compression unit that compresses the data to be transferred at the determined compression level; and a transfer unit for transferring the compressed data to be transferred to a transfer destination.

The object and advantages of the invention will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 is a hardware configuration diagram of an exemplary data transfer device;

FIG. 3 is a processing block configuration diagram of an exemplary data transfer device;

FIG. 4A and FIG. 4B are schematic diagrams illustrating a relationship between transfer processing of a preceding data and compression processing of a current data when a plurality of data are transferred;

FIG. 5 is a graph illustrating a correspondence between a transfer time of a first data and a time from when a transfer processing of a first data begins to when a transfer processing of a second data ends;

FIG. 6 is an illustration representing a difference in compression efficiency depending on types of data;

FIG. 7 is an illustration representing a difference in compression time depending on a number of processors;

FIG. 13 is a configuration diagram of a compression information table used for a determination processing in the case where a plurality of processors exist;

FIG. 15 is a configuration diagram of a compression information table used for a determination processing in a case where a plurality of processors exist and perform encryption;

FIG. 20 is a flowchart illustrating determination processing procedure in a case where a plurality of processors exist and perform encryption.

DETAILED DESCRIPTION OF EMBODIMENTS

Figure 1:
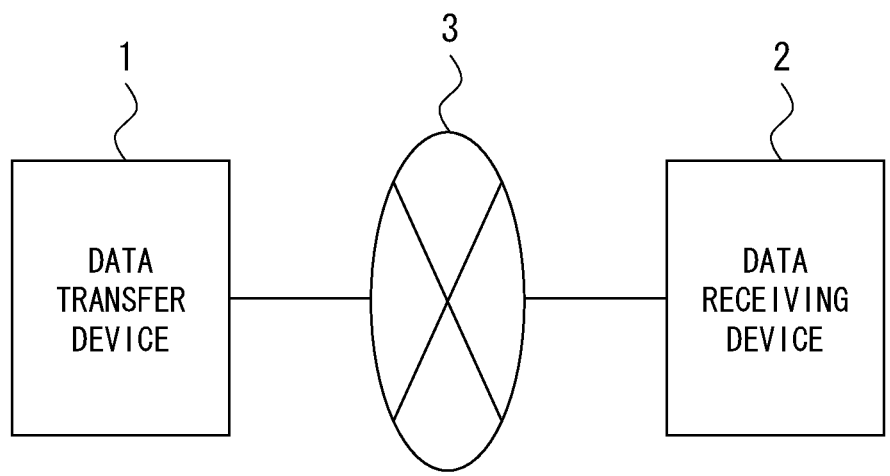
FIG. 1 is a configuration diagram of a data transfer system of an embodiment.

Reference will now be made in detail to the embodiments, examples of which are illustrated in the accompanying drawings, wherein like reference numerals refer to the like elements throughout. The embodiments are described below to explain the present invention by referring to the figures.

Since compression of video data is irreversible, if the quality of the video is reduced, the compression ratio may be increased. On the other hand, since compression of data in general is reversible, there is a limit to the compression ratio.

In addition, in recent years, cases are increasing where a plurality of processors are mounted in one personal computer such as a multi-core and multi CPU. Since transfer processing depends on the broadness of a network (transfer rate), no acceleration due to a number of processors may be expected. However, acceleration of compression processing becomes possible with a clever use of a plurality of processors.

An embodiment of the invention has been accomplished including in view of the above points, and it is an object of an embodiment of invention to provide a data transfer device, a data transfer method and a data transfer program embodied in a computer readable medium that minimizes a total time of predicted compression time and predicted transfer time.

In this connection, application of a component, an expression or any combination of components from an embodiment of the invention to a method, a device, a system, a computer program, a recording medium, a data structure or the like is valid as an aspect of the embodiment.

According to an embodiment of the invention described in detail below, a total time of predicted compression time and predicted transfer time may be minimized.

A data transfer system of an embodiment has parallel processing functions for compression, encryption and transfer of data. The data transfer device constituting the data transfer system of an embodiment has one or more CPUs (processors), and efficiently schedules compression, encryption and transfer processing.

When transferring a large volume of data between remote places, the data transfer system of an embodiment efficiently parallelizes compression processing, encryption processing and transfer processing of data in a data transfer device having a plurality of processors, thereby preventing the generation of wait time for these processes, and achieving acceleration of the transfer rate.

The data transfer system of an embodiment considers together compression, encryption and transfer processing, which are performed separately, so that a total time required for the compression, encryption and transfer processing is minimized. For example, since a typical data transfer system has considered the compression, encryption and transfer processing separately, the total time required for the compression, encryption and transfer processing has not necessarily been minimized.

FIG. 1 is a configuration diagram of a data transfer system of an embodiment. In the data transfer system, a data transfer device 1 and a data receiving device 2 are connected to each other through a network 3 which may transfer data. When transferring data from the data transfer device 1 to the data receiving device 2, the data transfer system efficiently parallelizes compression processing, encryption processing and transfer processing of data in the data transfer device 1 having a plurality of processors, thereby preventing the generation of wait time for the compression, encryption and transfer processing of data, and achieving acceleration of the transfer rate.

The data transfer device 1 is realized by a hardware configuration shown in FIG. 2, for example. FIG. 2 is a hardware configuration diagram of an exemplary data transfer device. The data transfer device 1 in FIG. 2 comprises an input device 11, an output device 12, a drive device 13, an auxiliary storage device 14, a main storage device 15, one or more calculation processing units 16-1 to 16-$n$ and an interface device 17, which are connected to one another via a bus B.

The input device 11 is constituted by a keyboard, a mouse and the like, and used to input various signals. The output device 12 is constituted by a display device and the like, and used to display various windows, data and the like. The interface device 17 is constituted by a modem, a LAN card and the like, and used to connect to the network 3.

A data transfer program of an embodiment is at least part of various program(s) that control the data transfer device 1. The data transfer program is, for example, distributed through a recording medium 18, or downloaded from the network 3.

As the recording medium 18 in which the data transfer program is recorded, various types of recording media may be used including a recording medium such as a CD-ROM, a flexible disk and a magneto optical disk that optically, electrically or magnetically records information, and a semiconductor memory such as a ROM and a flash memory that electrically records information.

Further, when the recording medium 18 in which the data transfer program is recorded is set in the drive device 13, the data transfer program is installed from the recording medium 18 in the auxiliary storage device 14 through the drive device 13. The data transfer program downloaded from the network 3 is installed in the auxiliary storage device 14 through the interface device 17.

The auxiliary storage device 14 stores necessary files, data and the like together with the installed data transfer program. At computer start-up time or when there is a request for startup from a user, the main storage device 15 reads the data transfer program from the auxiliary storage device 14 and stores the data. Then, the one or more calculation processing units 16-1 to 16-$n$ implement various processing as described in detail below in accordance with the data transfer program stored in the main storage device 15. While specific components of the data transfer device 1 are illustrated in FIG. 2, the present invention is not limited to that specific configuration. For example, one or more of components illustrated may be implemented as a single component.

When the one or more calculation processing units 16-1 to 16-$n$ are collectively called, they are simply referred to as a calculation processing unit 16. The data transfer program realizes the processing blocks shown in FIG. 3 by information processing using the hardware resources of the data transfer device 1 shown in FIG. 2. FIG. 3 is a processing block configuration diagram of an exemplary data transfer device. The data transfer device 1 shown in FIG. 3 comprises a storage section 31, a compression section 32, an encryption section 33, a determination section 34, a prediction section 35, a database (DB) 36, a transfer section 37 and a measurement section 38. Any one or more of operations described herein with respect to FIG. 3 may be implemented using hardware elements or software.

The storage section 31 stores data and the like to be transferred to the data receiving device 2. The compression section 32 uses one or more of the calculation processing units 16 to perform compression processing depending on compression level. The encryption section 33 uses one or more of the calculation processing units 16 to perform encryption processing. The determination section 34 determines a compression level so that a time required for compression processing, encryption processing and transfer processing is minimized. The detail of the processing for determining the compression level is described in detail below.

The prediction section 35 uses a compression information table stored in the DB 36 to predict the time required for compression processing, encryption processing and transfer processing. The detail of the compression information table is described in detail below. The transfer section 37 transfers data compressed at the compression level determined by the determination section 34 to the data receiving device 2. When the data is transferred to the data receiving device 2, the measurement section 38 measures a current transfer rate of a line used and notifies the prediction section 35 of a result. Next, the processing in the data transfer device 1 is described.

Here, an example will be given, in which data to be transmitted is 17.3 MB of CAD data. As a compression algorithm, the LZMA algorithm is used. Compression levels range from "0", which is no compression, to "5" where the compression ratio is highest. If the data to be transmitted is compressed at the compression level "5", the 17.3 MB of CAD data is compressed to 5.4 MB, for example. It is assumed that the compression processing took 20 seconds. Similarly, if the data to be transmitted is compressed at the compression level "1", the 17.3 MB of CAD data is compressed to 7.3 MB, for example. It is assumed that the compression processing took 7 seconds.

A higher compression level is better when only sizes of the data after compression are compared. However, it would be meaningless if the time required for the compression processing (compression time) is larger compared to the time required for the transfer processing (transfer time) that could be reduced by the compression processing.

For example, when the transfer rate of a line to be used is 1 Mbps, the time required to transfer the 17.3 MB of uncompressed CAD data is 138.9 seconds. In addition, in the case of the compression level "5", the size of the CAD data is 5.4 MB, therefore, the time required to transfer the CAD data after compression is 43.7 seconds. Similarly, in the case of the compression level "1", the size of the CAD data is 7.3 MB, therefore, the time required to transfer the CAD data after compression is 59.2 seconds.

In the case of the compression level "0", the time required for compression processing and transfer processing is 138.9 seconds, which is the addition of the compression time 0 second to the transfer time 138.9 seconds. In the case of the compression level "5", the time required for compression processing and transfer processing is 63.7 seconds, which is the addition of the compression time 20 seconds to the transfer time 43.7 seconds. In addition, in the case of the compression level "1", the time required for compression processing and transfer processing is 66.2 seconds, which is the addition of the compression time 7 seconds to the transfer time 59.2 seconds.

Namely, it may be seen that the time required for compression processing and transfer processing becomes shortest in the case of compression level "5". From the foregoing, in the case of the line whose transfer rate is 1 Mbps, the compression level "5" is adequate.

Next, a case where a transfer rate of a line to be used is 10 Mbps will be considered. When the transfer rate of the line to be used is 10 Mbps, the time required to transfer the 17.3 MB of uncompressed CAD data is 13.9 seconds. In addition, in the case of the compression level "5", the size of the CAD data is 5.4 MB, therefore, the time required to transfer the CAD data after compression is 4.4 seconds. Similarly, in the case of the compression level "1", the size of the CAD data is 7.3 MB, therefore, the time required to transfer the CAD data after compression is 5.9 seconds.

In the case of the compression level "0", the time required for compression processing and transfer processing is 13.9 seconds, which is the addition of the compression time 0 second to the transfer time 13.9 seconds. In addition, in the case of the compression level "5", the time required for compression processing and transfer processing is 24.4 seconds, which is the addition of the compression time 20 seconds to the transfer time 4.4 seconds. In addition, in the case of the compression level "1", the time required for compression processing and transfer processing is 12.9 seconds, which is the addition of the compression time 7 seconds to the transfer time 5.9 seconds.

Namely, it may be seen that the time required for compression processing and transfer processing becomes shortest in the case of compression level "1". From the foregoing, in the case of the line whose transfer rate is 10 Mbps, the compression level "1" is adequate.

The data transfer system of an embodiment calculates, for each compression level, a time required for compression processing and transfer processing, and selects a compression level at which a time required for the compression processing and a transfer processing becomes shortest to determine compression at which compression level is the most efficient.

Assuming that the compression level is L, the size of the CAD data is V, the compression time is $C(L, V)$, the size of the data after compression is $S(L, V)$, and the transfer time is $T(S(L, V))$, the data transfer system of an embodiment determines L at which $C(L, V) + T(S(L, V))$ becomes smallest before the CAD data is transferred, and compresses the CAD data at the compression level L before transfer.

Typically, in the case that a plurality of data are to be transferred, for example, when data labeled as A (hereinafter simply referred to as "A") is compressed and transferred, and then data labeled as B (hereinafter simply referred to as "B") is transferred, "B" is compressed while "A" is being transferred.

If "A" was larger in size compared to "B", waste in the compression time of "B" occurred. On the contrary, if "A" was smaller in size compared to "B", the compression time of "B" was longer, which was a issue. Thus, the data transfer system of the present embodiment solves the issue as described below. While particular example of CAD data has been described herein, the present invention is not limited to transferring any particular type of data.

In contrast to image data, when a plurality of data such as text files and application files are transferred sequentially, if attempts are made to optimize the time for performing compression processing and transfer processing in parallel until the transfer of all the data is finished, the time required for the compression processing for each data becomes limited.

For example, when files A, B, C, . . . (hereinafter simply referred to as "A", "B", "C", . . . ) are transferred in order of A, B, C, . . . , for the first "A", an optimal compression level LA may be determined by the method in the case of one data described above, and the data may be compressed at the compression level LA and then transferred.

The next "B" has to be compressed while "A" is being transferred. If "A" is small data, the transfer time "t" is short, therefore, the optimal compression level LB at which "B" may be compressed within "t", which is the time that may be taken for the compression processing of "B", has to be determined. However, practically, when the compression processing is efficient, there are also some cases where it is more efficient to take the time "t" or longer to perform compression processing and then transfer the data.

FIG. 4A and FIG. 4B are schematic diagrams illustrating a relationship between transfer processing of a preceding data and compression processing of a current data when a plurality of data are transferred. FIG. 4A shows a situation in which an optimal compression level LB is determined, at which "B" may be compressed within the transfer time "t" of the preceding data "A", and "B" is compressed at the compression level LB. In the case of FIG. 4A, since the compression processing of "B" is shorter than the transfer time "t" of "A", transfer processing of "B" may be started immediately after the transfer processing of "A" ends.

Meanwhile, FIG. 4B shows a situation in which the optimal compression level LB is determined, at which "B" is compressed taking the transfer time "t" of the preceding data "A" or longer, and "B" is compressed at the compression level LB and then transferred. In the case of FIG. 4B, since the compression processing of "B" is longer than the transfer time "t" of "A", transfer processing of "B" cannot be started immediately after the transfer processing of "A" ends. However, in the case of FIG. 4B, the compression processing of "B" being more efficient, the data size of "B" became smaller than that of FIG. 4A, therefore, the transfer processing of "B" finishes faster than that of FIG. 4A.

By way of example, a case where two data are transferred on a line whose transfer rate is 20 Mbps will be considered below. During the transfer of the first data, the data transfer device 1 compresses the second data in which is a size of 17.3 MB, and after the transfer processing of the first data and the compression processing of the second data have both finished, starts the transfer processing of the second data.

FIG. 5 is a graph illustrating a correspondence between a transfer time of a first data and a time from when a transfer processing of the first data begins to when a transfer processing of a second data ends. The graph of FIG. 5 has a horizontal axis indicating the transfer time of the first data from 0 second to 15 seconds, and a vertical axis indicating the time from when the transfer processing of the first data begins to when the transfer processing of the second data ends for each compression level.

As is clear from FIG. 5, when the transfer time of the first data is between 0 second and 2 seconds, the transfer time may be shortened if the second data is not compressed. Further, when the transfer time of the first data is between 2 seconds and 9 seconds, the transfer time may be shortened if the second data is compressed at the compression level "1". Furthermore, when the transfer time of the first data is 9 seconds or longer, the transfer time may be shortened if the second data is compressed at the compression level "3" although the difference is negligible.

When the size of the first data is V1, for compression levels L1, L2, L3, ..., Ln, the compression level L that minimizes the value in the following formula (1) is determined before the first data is transferred, and the compression processing of the first data is performed at the compression level L.

$$C(L,V_1)+T(S(L,V_1)) \quad (1)$$

It is assumed that the compression level for the first data at this time is L'1. For the second and subsequent data, when the size of the $m^{th}$ data to be transferred is Vm, for each of the compression levels L1, L2, L3, ..., Ln, the compression level L that minimizes the value in the following formula (2) is determined, and the compression processing of the $m^{th}$ data is performed at the compression level L.

$$MAX(C(L,V_m),T(S(L'_{m-1},V_{m-1})))+T(S(L,V_m)) \quad (2)$$

If a number of data to be transferred and the data size are all known before the transfer is started, it is also possible to determine all the values of the compression levels L1, L2, L3, ..., Ln that minimize the value in the following formula (3) and then start the data transfer.

$$C(L'_1, V_1) + T(S(L'_1, V_1)) + \sum_{i=2}^{n}(MAX(C(L'_i, V_i), T(S(L'_{i-1}, V_{i-1}))) + T(S(L'_i, V_i))) \quad (3)$$

Determining the values of C(L, V), S(L, V), T(S(L, V)) in the formula described above at the time of transfer is difficult. For example, since the transfer time of data is proportional to the data size, it may be determined from the transfer rate of the line and the data size. However, the size of the data after compression and the compression time are not known until the compression processing is performed.

For example, a method may be considered in which a compression time and a compression ratio are determined by compressing a portion of the data. However, since a compression time and a compression ratio are almost determined by the type of data, a compression time and a compression ratio for each data type are stored in the compression information table in the database 36 in advance, and when values are needed, they are obtained from the compression information table in the database 36.

For example, there is the difference in compression efficiency depending on the types of data as shown in FIG. 6. FIG. 6 is an illustration representing a difference in compression efficiency depending on types of data. In the compression information table in the database 36, for example, for each data type classified by data name extension, the compression time and the size of data after compression are recorded for a unit size of data (e.g., 1 MB).

In the case of data with different size, the compression time and the size of the data after the compression are calculated by multiplying the compression time and the size of the data after compression for a unit size of data from the compression information table. The compression time of the data depends on the specs of a PC. In addition, the compression time of data varies depending on the application that created the data even if the data has the same extension.

Therefore, every time data is compressed, the data transfer device 1 updates the compression information table with the result of the compression as an average value. Further, since the transfer rate of the line is not often constant, the data transfer device 1 determines and uses the transfer rate of the current line every time data is transferred.

In recent years, in the data transfer device 1, a multiprocessor environment has become common in which a plurality of processors may be used simultaneously. By using such a plurality of processors to perform compression processing, the compression time is reduced in the data transfer device 1 as shown in FIG. 7. FIG. 7 is an illustration representing the difference in compression time depending on the number of processors. Using a plurality of processors to perform compression processing reduces the compression time, therefore, the number of available processors has to be considered when the optimal compression level is determined, and learning is performed as described above.

When the size of the first data is V1, for the number of available processors N1, N2, N3, ..., Nn and the compression levels L1, L2, L3, ..., Ln, the compression level L and the number of processors N that minimize the value in the following formula (4) are determined before the first data is transferred, and the compression processing of the first data is performed with the compression level L and the number of processors N.

$$C(L,V_1,N)+T(S(L_1V_1)) \qquad (4)$$

It is assumed that the compression level for the first data is L'1, and the number of processors used for the compression of the first data is N'1. For the second and subsequent data, when the size of the $m^{th}$ data to be transferred is Vm, for the number of available processors N1, N2, N3, ..., Nn and the compression levels L1, L2, L3, ..., Ln, the compression level L and the number of processors N that minimize the value in the following formula (5) are determined, and the compression processing of the $m^{th}$ data is performed with the compression level L and the number of processors N.

$$MAX(C(L,V_m,N),T(S(L'_{m-1},V_{m-1})))+T(S(L,V_m)) \qquad (5)$$

Figure 8:
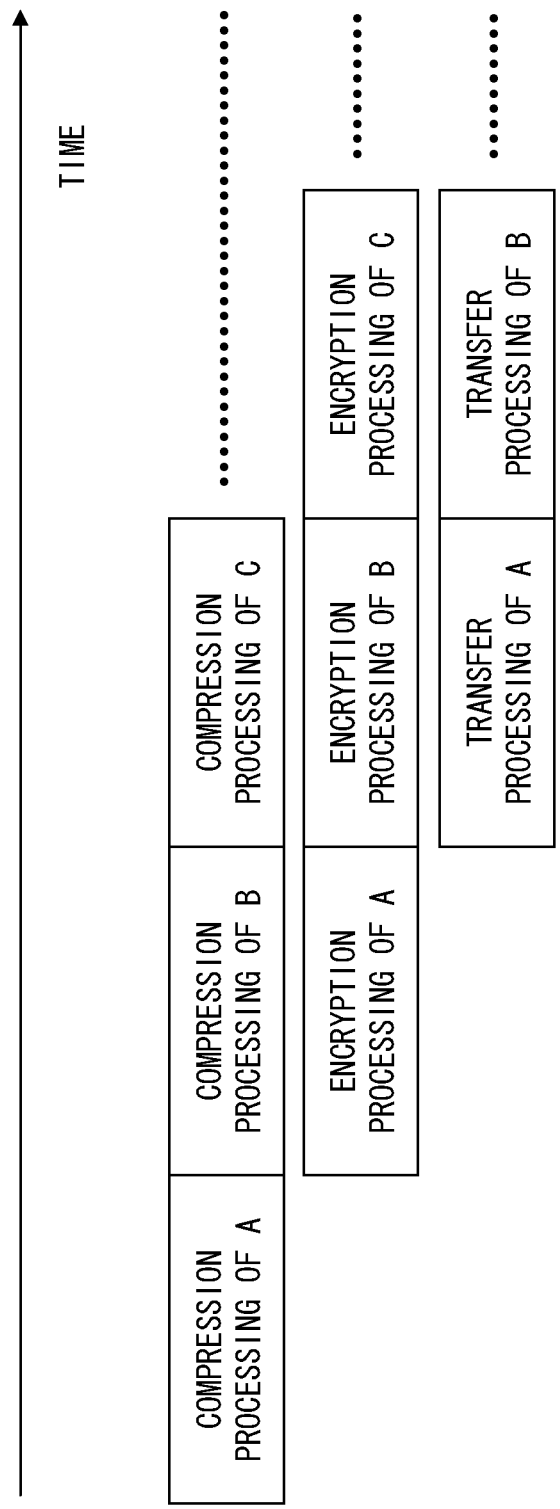
FIG. 8 is a schematic diagram illustrating parallelization of compression processing, encryption processing and transfer processing.

In order to safely transfer data, it is important to encrypt the data before transfer. When there are two or more processors, compression processing, encryption processing and transfer processing may be performed in parallel, which requires the adjustment of the compression level which balances compression processing, encryption processing and transfer processing. When compression processing, encryption processing and transfer processing are performed in parallel, the compression processing, encryption processing and transfer processing are performed simultaneously as shown in FIG. 8. FIG. 8 is a schematic diagram illustrating parallelization of compression processing, encryption processing and transfer processing.

Since there is no particular level for encryption, assuming that the number of processors for performing encryption processing is M, the time required for encryption processing (encryption time) is E (V, M), and the size of data after encryption is S2(V), the values of L, N and M that minimize the value in the following formula (6) are determined for the first data.

$$C(L,V_1,N)+E(S(L,V_1),M)+T(S_2(S(L,V_1))) \qquad (6)$$

(Note, M, N≦the number of processors)

It is assumed that the number of processors used for the encryption of the first data at that time is M'1. For the second data, as shown in FIG. 8, there is no data which is being transferred at the time of compression of the second data, therefore, the values of L, N and M that minimize the value in the following formula (7) are determined.

$$MAX(C(L,V_2,N),E(S(L'_1,V_1),M'_1)+MAX(E(S(L,V_2),M),T(S_2(S(L'_1,V_1))))+T(S_2(S(L,V_2))) \qquad (7)$$

(Note, M'$_1$+N≦the number of processors)

For the third and subsequent data, the values of L, N and M that minimize the value in the following formula (8) are determined.

$$MAX(C(L,V_m,N),E(S(L'_{m-1},V_{m-1}),M'_{m-1}),T(S_2(S(L'_{m-2},V_{m-2}))))+MAX(E(S(L,V_m),M),T(S_2(S(L'_{m-1},V_{m-1}))))+T(S_2(S(L,V_m))) \qquad (8)$$

(Note, M'$_{m+1}$+N≦the number of processors)

The data transfer device 1 may learn encryption time as well as compression time in order to improve the accuracy. When there are processes that may be parallelized other than encryption processing, the data transfer time may be reduced by modifying (adjusting) similarly the formulas (6) to (8) described above to determine the optimal compression level.

Figure 9:
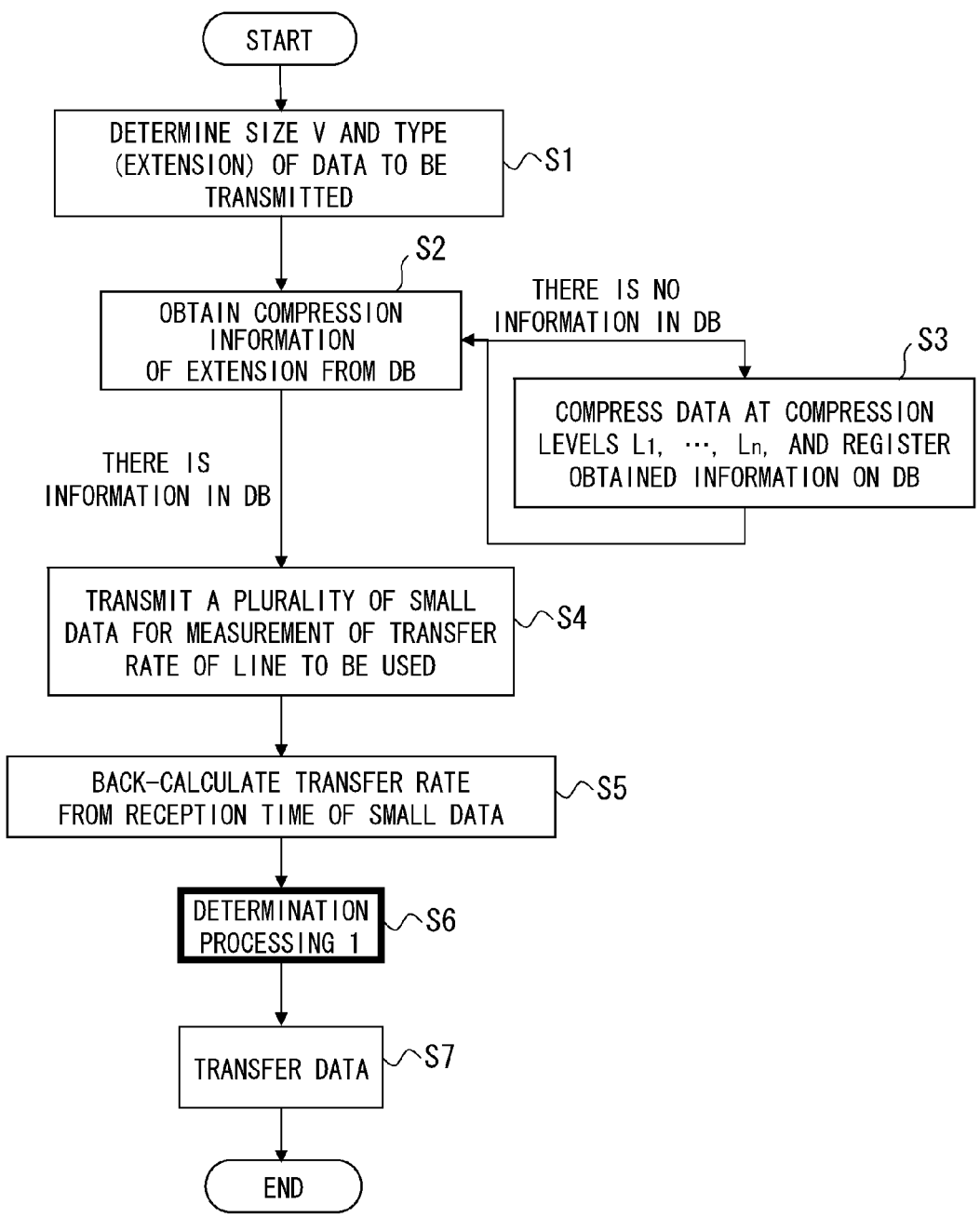
FIG. 9 is a flowchart illustrating processing procedure in a case where a first data is transmitted.

The processing procedure of the data transfer device 1 is described below in detail with reference to flowcharts separately for the case where the first data is transmitted, and the case where the second and subsequent data are transmitted. FIG. 9 is a flowchart illustrating processing procedure in a case where a first data is transmitted.

The procedure proceeds to operation S1, where the prediction section 35 of the data transfer device 1 obtains the size V of data to be transmitted, and at the same time determines the type of the data to be transmitted from the extension of the data name. The procedure proceeds to operation S2, where the prediction section 35 attempts to obtain a compression information table, which is described in detail below, corresponding to the type (extension) of data to be transmitted from the DB 36.

If there is no compression information table in the DB 36 corresponding to a type of the data to be transmitted, the prediction section 35 proceeds to operation S3, compresses part or all of the data to be transmitted at the compression levels L1, L2, L3, ..., Ln, creates a compression information table from the obtained information (compression speed and compression ratio), registers the table on the DB 36, and then returns to operation S2.

If there is a compression information table in the DB 36 corresponding to the type of the data to be transmitted, the prediction section 35 obtains the compression information table corresponding to the type of the data to be transmitted, and proceeds to operation S4. In operation S4, a plurality of small data used for measurement of the transfer rate of the line to be used are transmitted from the transfer section 37 to the data receiving device 2. When the data receiving device 2 receives the small data used for measurement of the transfer rate of the line to be used, the reception time of the small data is notified to the data transfer device 1.

When the reception time of the small data is notified from the data receiving device 2, the measurement section 38 proceeds to operation S5, and back-calculates the transfer rate of the line to be used from the transmission time and reception time of the small data. The processes of operations S4 and S5 may be omitted when the transfer rate of the line to be used is specified.

The procedure proceeds operation S6, where the prediction section 35 uses the obtained compression information table to predict the total time of the time required for transfer preparation such as compression processing and encryption processing and the time required for the transfer processing. The determination section 34 performs determination processing to determine the most efficient compression level at which a total time of the time required for the transfer preparation such as compression processing and encryption processing and the time required for the transfer processing is shortest, and cause the compression section 32 and the encryption section 33 to perform the transfer preparation such as compression processing and encryption processing at the compression level.

The determination processing according to an embodiment is small enough to be ignored compared to the time required for the transfer preparation such as compression processing and encryption processing and the time required for the transfer processing. Following operation S6, the procedure proceeds to operation S7, where the determination section 34 causes the data for which transfer preparation ended to be transmitted from the transfer section 37 to the data receiving device 2.

Therefore, the data transfer device 1 performs optimization so that the processing time involved in one data transfer is shortest.

Figure 10:
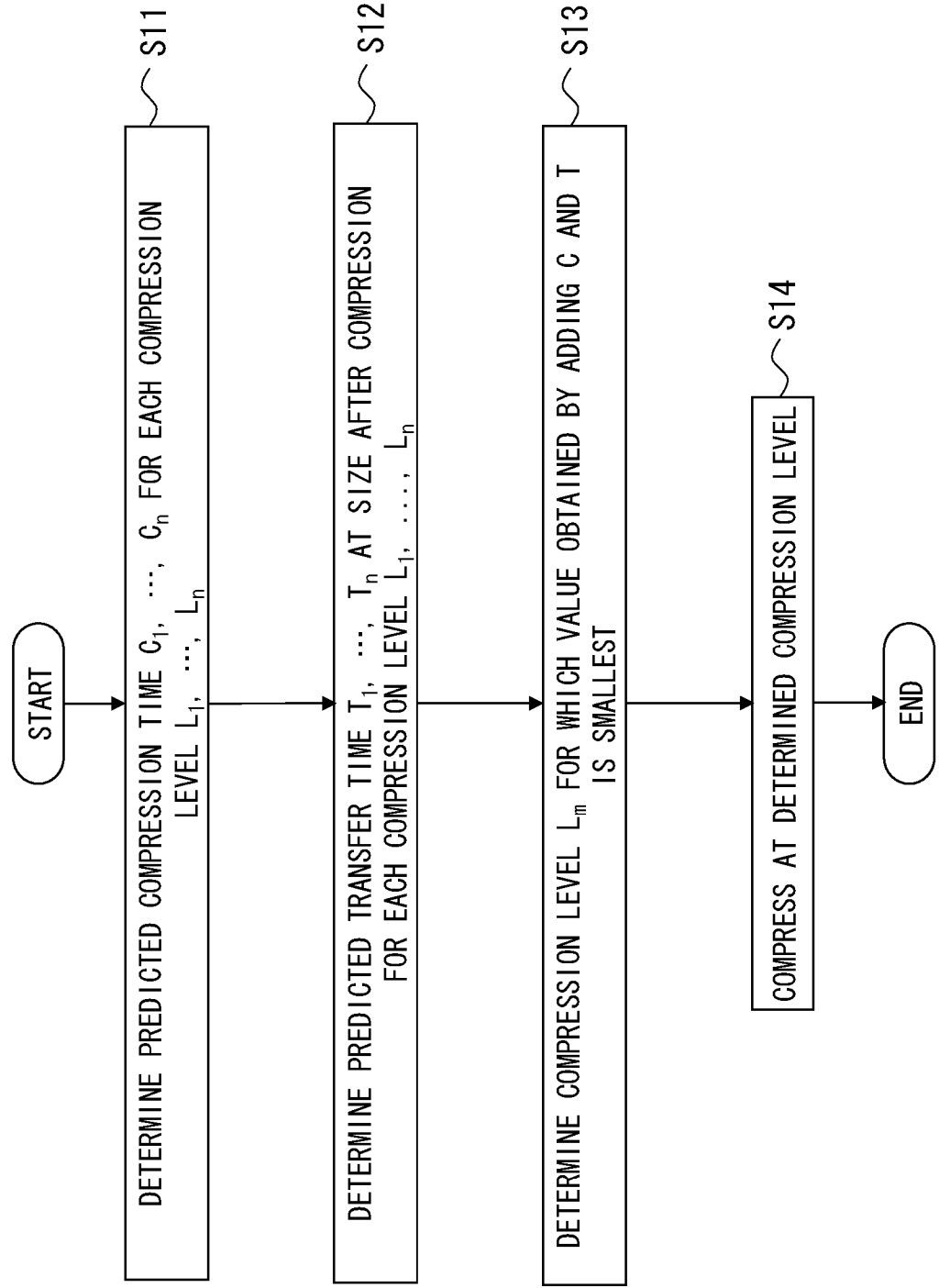
FIG. 10 is a flowchart illustrating determination processing procedure in a normal case.

The detail of the determination processing of operation S6 is described separately for a normal case, a case where a plurality of processors exist, and a case where a plurality of processors exist and perform encryption. FIG. 10 is a flowchart illustrating determination processing procedure in a normal case. In the flowchart of FIG. 10, a compression information table shown in FIG. 11 is used.

Figure 11:
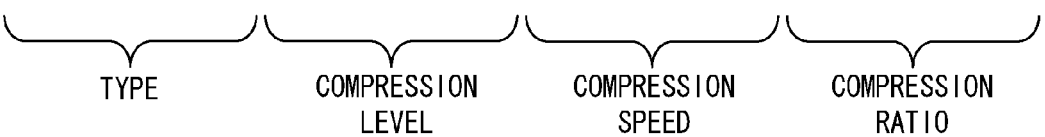
FIG. 11 is a configuration diagram of a compression information table used for a determination processing in a normal case.

FIG. 11 is a configuration diagram of the compression information table used for the determination processing in a normal case. On the compression information table of FIG. 11, a compression speed and a compression ratio are registered for each combination of type of data and compression level.

The procedure proceeds to operation S11 of FIG. 10, where the prediction section 35 uses the compression information table of FIG. 11 to determine, for the compression levels L1, L2, L3, . . . , Ln, the predicted time (predicted compression time) C1, C2, C3, . . . , Cn required for the compression processing of the data to be transmitted.

The procedure proceeds to operation S12, where the prediction section 35 uses the compression information table to determine, for the compression levels L1, L2, L3, . . . , Ln, the predicted time (predicted transfer time) T1, T2, T3, . . . , Tn required for the transfer processing at the size of the data after compression.

The procedure proceeds to operation S13, where the determination section 34 adds the predicted compression time C1, C2, C3, . . . , Cn and the predicted transfer time T1, T2, T3, . . . , Tn, for each compression level, to determine the compression level Lm for which the added value is smallest. The procedure proceeds to operation S14, where the compression section 32 compresses the data to be transmitted at the compression level Lm determined by the determination section 34.

Therefore, the data transfer system of an embodiment efficiently parallelizes compression processing and transfer processing of data in the data transfer device 1 having one processor, thereby preventing the generation of wait time for these processes, and achieving acceleration of the transfer rate.

Figure 12:
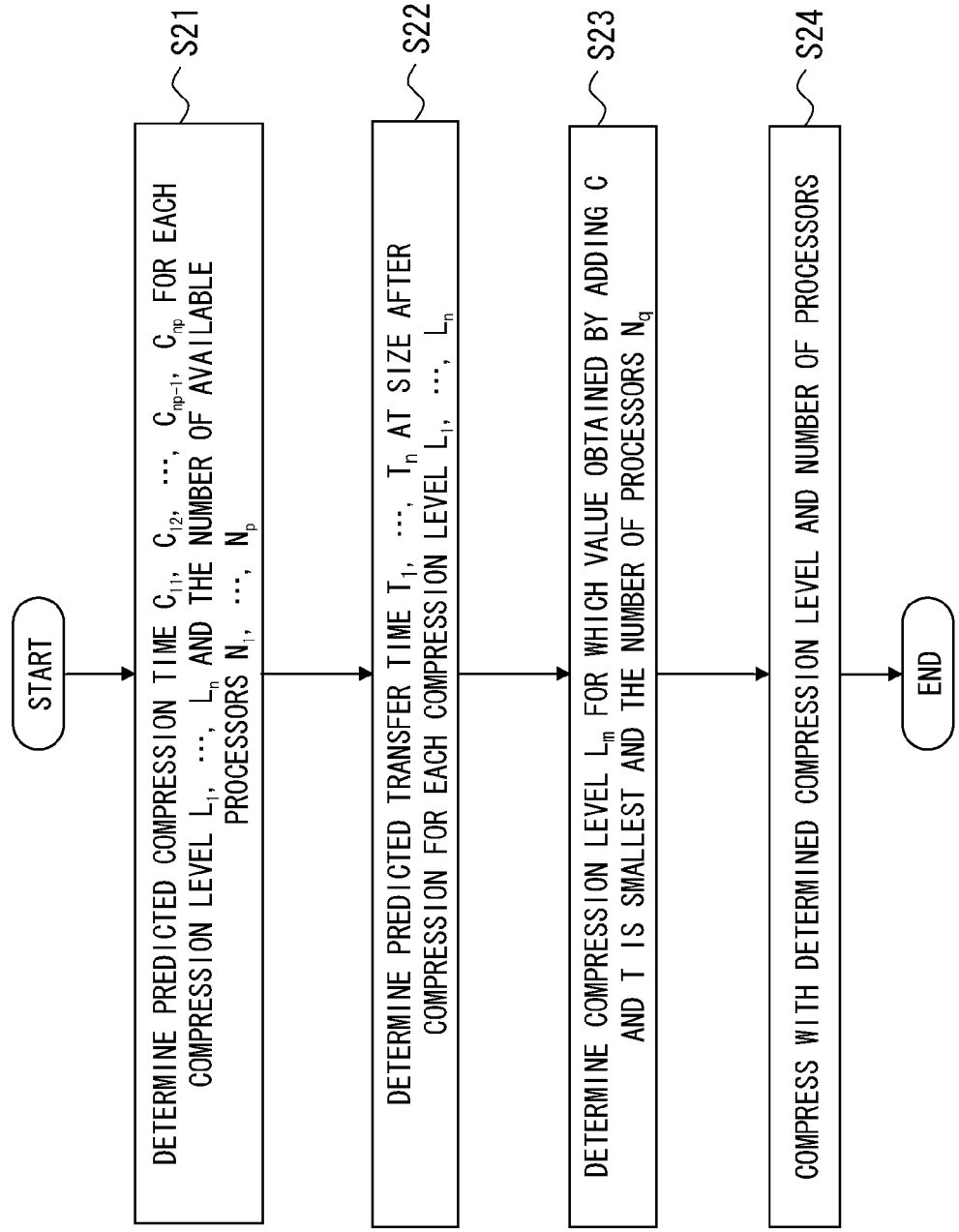
FIG. 12 is a flowchart illustrating determination processing procedure in a case where a plurality of processors exist.

Further, FIG. 12 is a flowchart illustrating determination processing procedure in the case where a plurality of processors exist. In the flowchart of FIG. 12, a compression information table shown in FIG. 13 is used.

FIG. 13 is a configuration diagram of the compression information table used for the determination processing in the case where a plurality of processors exist. On the compression information table of FIG. 13, a compression ratio is registered for each combination of type of data and compression level, and a compression speed is also registered for each combination of type of data, compression level and number of processors.

The procedure proceeds to operation S21 of FIG. 12, where the prediction section 35 uses the compression information table of FIG. 13 to determine, for each combination of the compression levels L1, L2, L3, . . . , Ln and the number of available processors N1, N2, N3, . . . , Np, the predicted time (predicted compression time) C11, C12, . . . , Cnp−1, Cnp required for the compression processing of the data to be transmitted.

The procedure proceeds to operation S22, where the prediction section 35 uses the compression information table to determine, for the compression levels L1, L2, L3, . . . , Ln, the predicted time (predicted transfer time) T1, T2, T3, . . . , Tn required for the transfer processing at the size of the data after compression.

The procedure proceeds to operation S23, where the determination section 34 adds the predicted compression time C11, C12, . . . , Cnp−1, Cnp and the predicted transfer time T1, T2, T3, . . . , Tn, for each compression level, to determine a combination of the compression level Lm for which the added value is smallest and the number of processors Nq. The procedure proceeds to operation S24, where the compression section 32 compresses the data to be transmitted with the compression level Lm and the number of processors Nq determined by the determination section 34.

Therefore, the data transfer system of an embodiment efficiently parallelizes compression processing and transfer processing of data in the data transfer device 1 having a plurality of processors, thereby preventing the generation of wait time for these processes, and achieving acceleration of the transfer rate.

Figure 14:
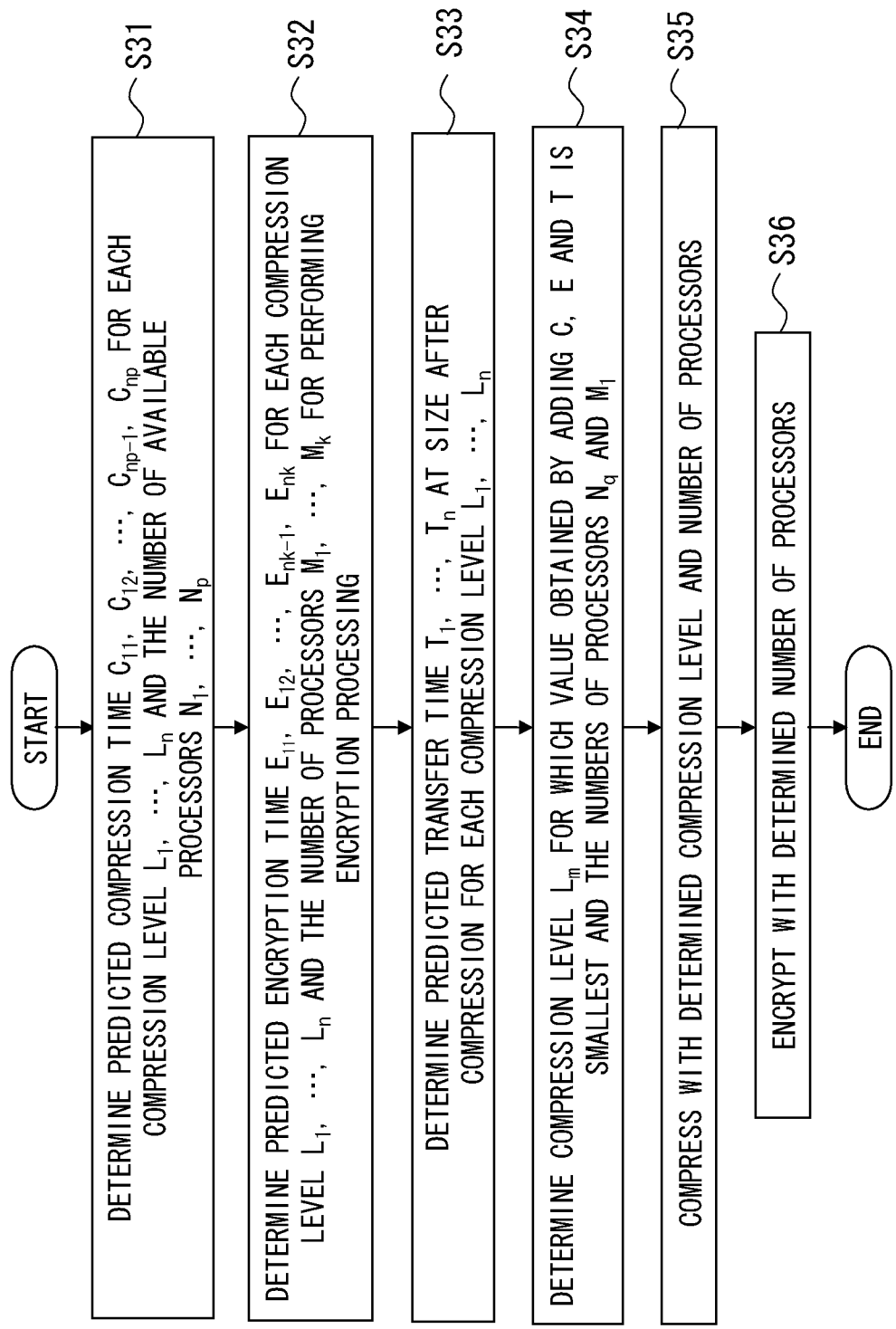
FIG. 14 is a flowchart illustrating determination processing procedure in a case where a plurality of processors exist and perform encryption.

Further, FIG. 14 is a flowchart illustrating determination processing procedure in the case where a plurality of processors exist and perform encryption. In the flowchart of FIG. 14, a compression information table shown in FIG. 15 is used.

FIG. 15 is a configuration diagram of the compression information table used for the determination processing in the case where a plurality of processors exist and perform encryption. On the compression information table of FIG. 15, a compression ratio is registered for each combination of type of data and compression level, and a compression speed and an encryption speed are also registered for each combination of type of data, compression level and number of processors.

The procedure proceeds to operation S31 of FIG. 14, where the prediction section 35 uses the compression information table of FIG. 15 to determine, for each combination of the compression levels L1, L2, L3, . . . , Ln and the number of available processors N1, N2, N3, . . . , Np, the predicted time (predicted compression time) C11, C12, . . . , Cnp−1, Cnp required for the compression processing of the data to be transmitted.

Further, the procedure proceeds to operation S32, where the prediction section 35 uses the compression information table of FIG. 15 to determine, for each combination of the compression levels L1, L2, L3, . . . , Ln and the number of processors M1, M2, M3, . . . , Mk for performing encryption processing, the predicted time (predicted encryption time) E11, E12, . . . , Enk−1, Enk required for the encryption processing of the data to be transmitted.

The procedure proceeds to operation S33, where the prediction section 35 uses the compression information table to determine, for the compression levels L1, L2, L3, . . . , Ln, the predicted time (predicted transfer time) T1, T2, T3, . . . , Tn required for the transfer processing at the size of the data after compression.

The procedure proceeds to operation S34, where the determination section 34 adds the predicted compression time C11, C12, . . . , Cnp−1, Cnp, the predicted encryption time E11, E12, . . . , Enk−1, Enk and the predicted transfer time T1, T2, T3, . . . , Tn, for each compression level, to determine a combination of the compression level Lm for which the added value is smallest and the numbers of processors Nq and Mi. The procedure proceeds to operation S35, where the compression section 32 compresses the data to be transmitted with the compression level Lm and the numbers of processors Nq, Mi determined by the determination section 34. The procedure proceeds to operation S36, where the encryption section 33 encrypts the data to be transmitted with the number of processors Mi.

Therefore, the data transfer system of an embodiment efficiently parallelizes compression processing, encryption processing and transfer processing of data in the data transfer device having a plurality of processors, thereby preventing the generation of wait time for these processes, and achieving acceleration of the transfer rate.

Figure 16:
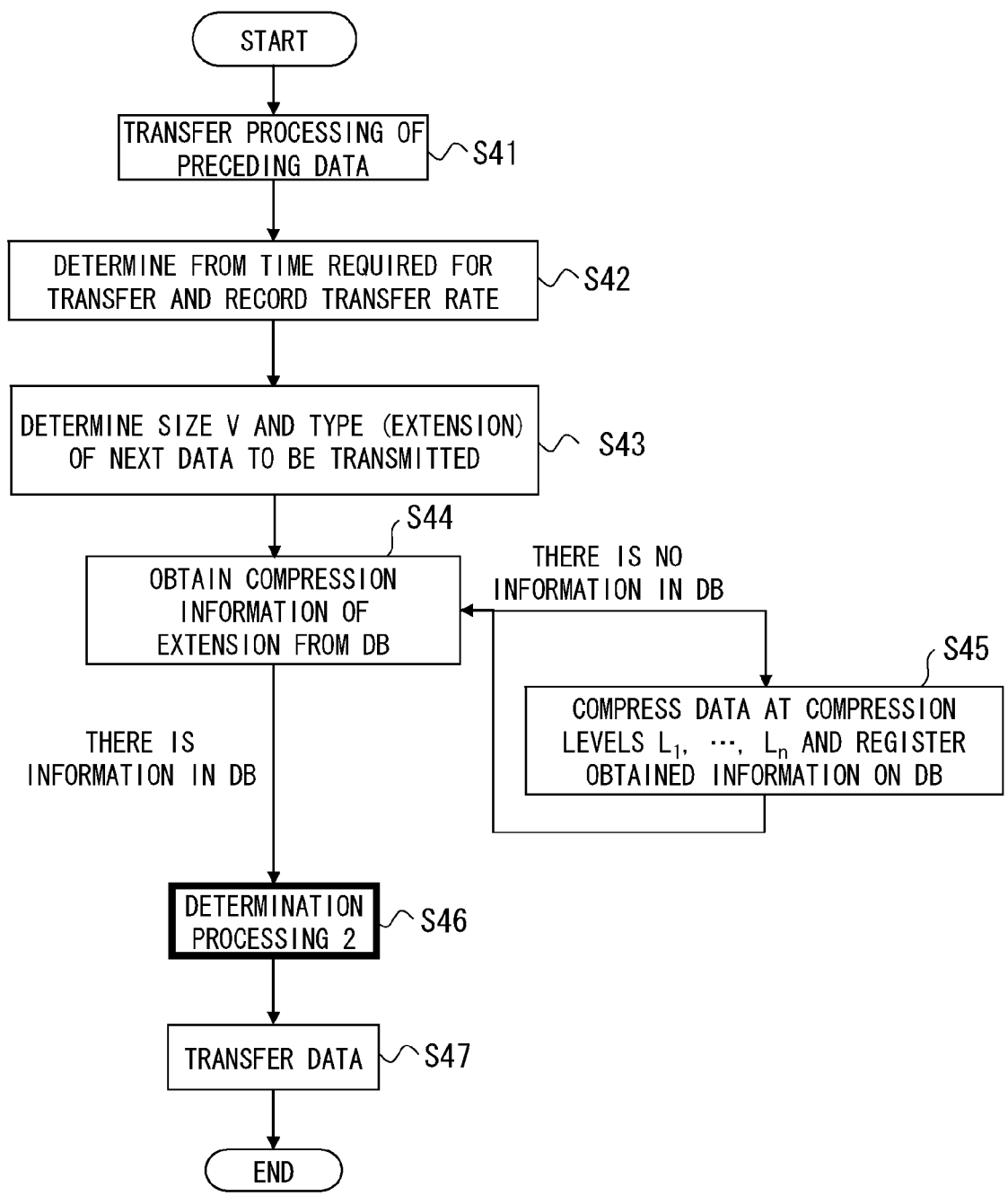
FIG. 16 is a flowchart illustrating processing procedure in a case where a second and subsequent data are transmitted.

Next, the processing procedure of the data transfer device 1 is described with reference to the flowchart in a case where the second and subsequent data are transmitted. FIG. 16 is a flowchart illustrating processing procedure in the case where the second and subsequent data are transmitted.

In operation S41, the preceding data is transferred. For example, if the preceding data is the first data, the data is transferred by the processing procedure of FIG. 9 described above. If the preceding data is the second or subsequent data, the data is transferred by the processing procedure shown in the flowchart of FIG. 16.

The procedure proceeds to operation S42, where the measurement section 38 determines the transfer rate of the line to be used from the time required to transfer the preceding data, and records the transfer rate. The procedure proceeds to operation S43, where the prediction section 35 of the data transfer device 1 obtains the size V of the next data to be transmitted, and at the same time determines the type of the next data to be transmitted from the extension of the data name. The procedure proceeds to operation S44, where the expectation section 35 attempts to obtain the compression information table described above corresponding to the type (extension) of the next data to be transmitted from the DB 36.

If there is no compression information table in the DB 36 corresponding to the type of data to be transmitted, the prediction section 35 proceeds to operation S45, compresses part or all of the data to be transmitted at the compression levels L1, L2, L3, ..., Ln, creates a compression information table from the obtained information (compression speed and compression ratio), registers the table on the DB 36, and then returns to operation S44. If there is a compression information table in the DB 36 corresponding to the type of the data to be transmitted, the prediction section 35 obtains the compression information table corresponding to the type of the data to be transmitted, and proceeds to operation S46.

The procedure proceeds to operation S46, where the prediction section 35 uses the obtained compression information table to predict the total time of the longer of the time required for the transfer preparation such as compression processing and encryption processing of the next data to be transmitted and the time required to transfer the preceding data, and the time required for the transfer processing of the next data. The determination section 34 performs determination processing to determine the most efficient compression level at which the total time of the longer of the time required for the transfer preparation such as compression processing and encryption processing of the next data to be transmitted and the time required to transfer the preceding data, and the time required for the transfer processing of the next data is shortest, and cause the compression section 32 and the encryption section 33 to perform the transfer preparation such as compression processing and encryption processing at the compression level. Following operation S46, the procedure proceeds to operation S47, where the determination section 34 causes the data for which transfer preparation ended to be transmitted from the transfer section 37 to the data receiving device 2.

Therefore, the data transfer device 1 performs optimization so that the processing time involved in the transfer of a plurality of data is shortest.

Figure 17:
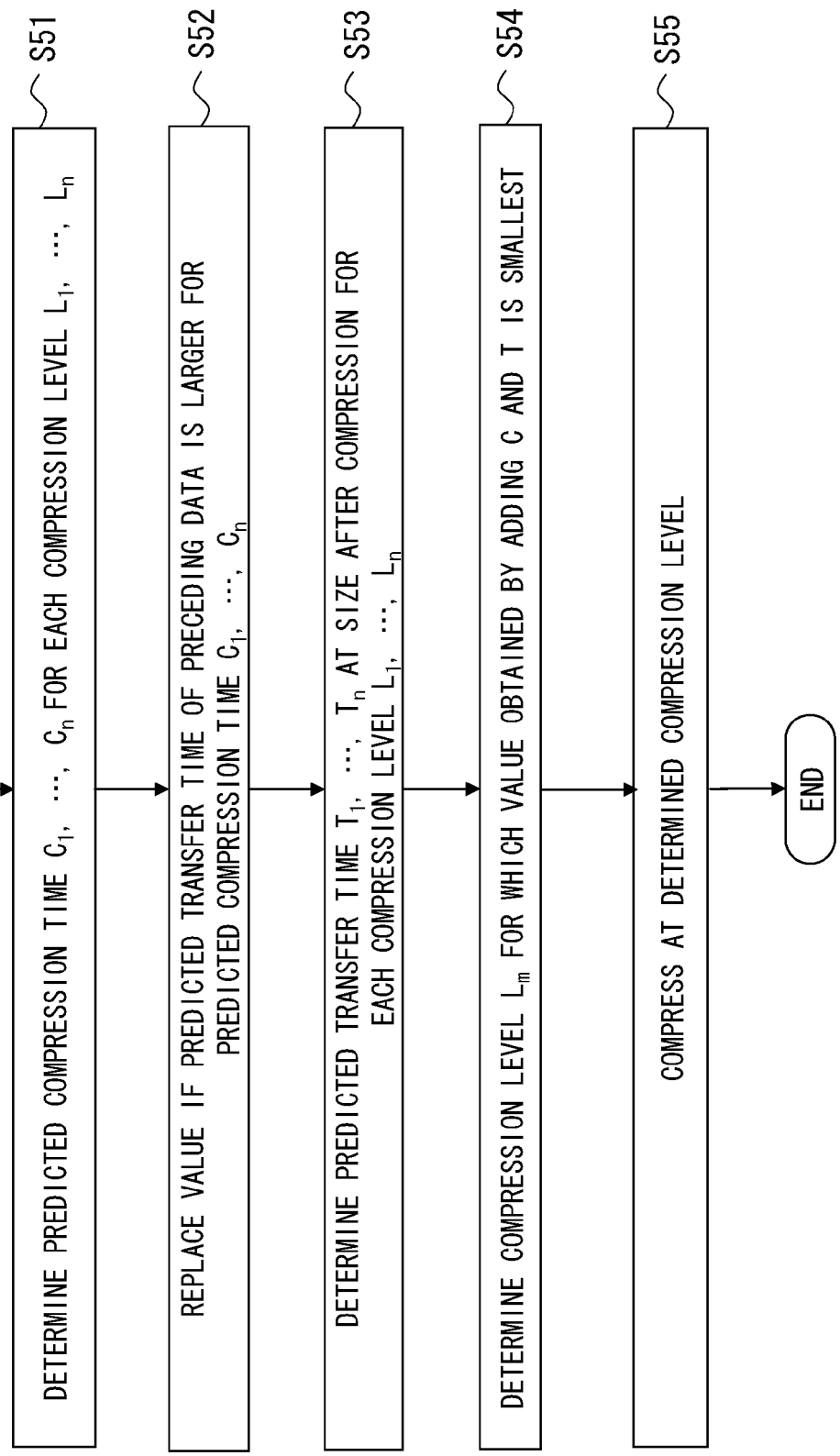
FIG. 17 is a flowchart illustrating determination processing procedure in a normal case.

The detail of the determination processing of operation S46 is described separately for a normal case, a case where a plurality of processors exist, and a case where a plurality of processors exist and perform encryption. FIG. 17 is a flowchart illustrating determination processing procedure in a normal case. In the flowchart of FIG. 17, the compression information table shown in FIG. 11 is used.

The procedure proceeds to operation S51 of FIG. 17, where the prediction section 35 uses the compression information table of FIG. 11 to determine, for the compression levels L1, L2, L3, ..., Ln, the predicted time (predicted compression time) C1, C2, C3, ..., Cn required for the compression processing of the next data to be transmitted.

The procedure proceeds to operation S52, where, if the predicted transfer time of the preceding data is larger for the predicted compression time C1, C2, C3, ..., Cn, the prediction section 35 replaces the predicted compression time C1, C2, C3, ..., Cn with the predicted transfer time of the preceding data. The processing of operation S52 addresses the fact that the transfer processing of the next data to be transmitted cannot be started if the transfer processing of the preceding data is not finished as shown in FIG. 4.

The procedure proceeds to operation S53, where the prediction section 35 uses the compression information table to determine, for the compression levels L1, L2, L3, ..., Ln, the predicted time (predicted transfer time) T1, T2, T3, ..., Tn required for the transfer processing at the size of the data after compression.

The procedure proceeds to operation S54, where the determination section 34 adds the predicted compression time C1, C2, C3, ..., Cn and the predicted transfer time T1, T2, T3, ..., Tn, for each compression level, to determine the compression level Lm for which the added value is smallest. The procedure proceeds to operation S55, where the compression section 32 compresses the data to be transmitted at the compression level Lm determined by the determination section 34.

Therefore, the data transfer system of an embodiment efficiently parallelizes compression processing and transfer processing of data in the data transfer device 1 having one processor, thereby preventing the generation of wait time for these processes, and achieving acceleration of the transfer rate.

Figure 18:
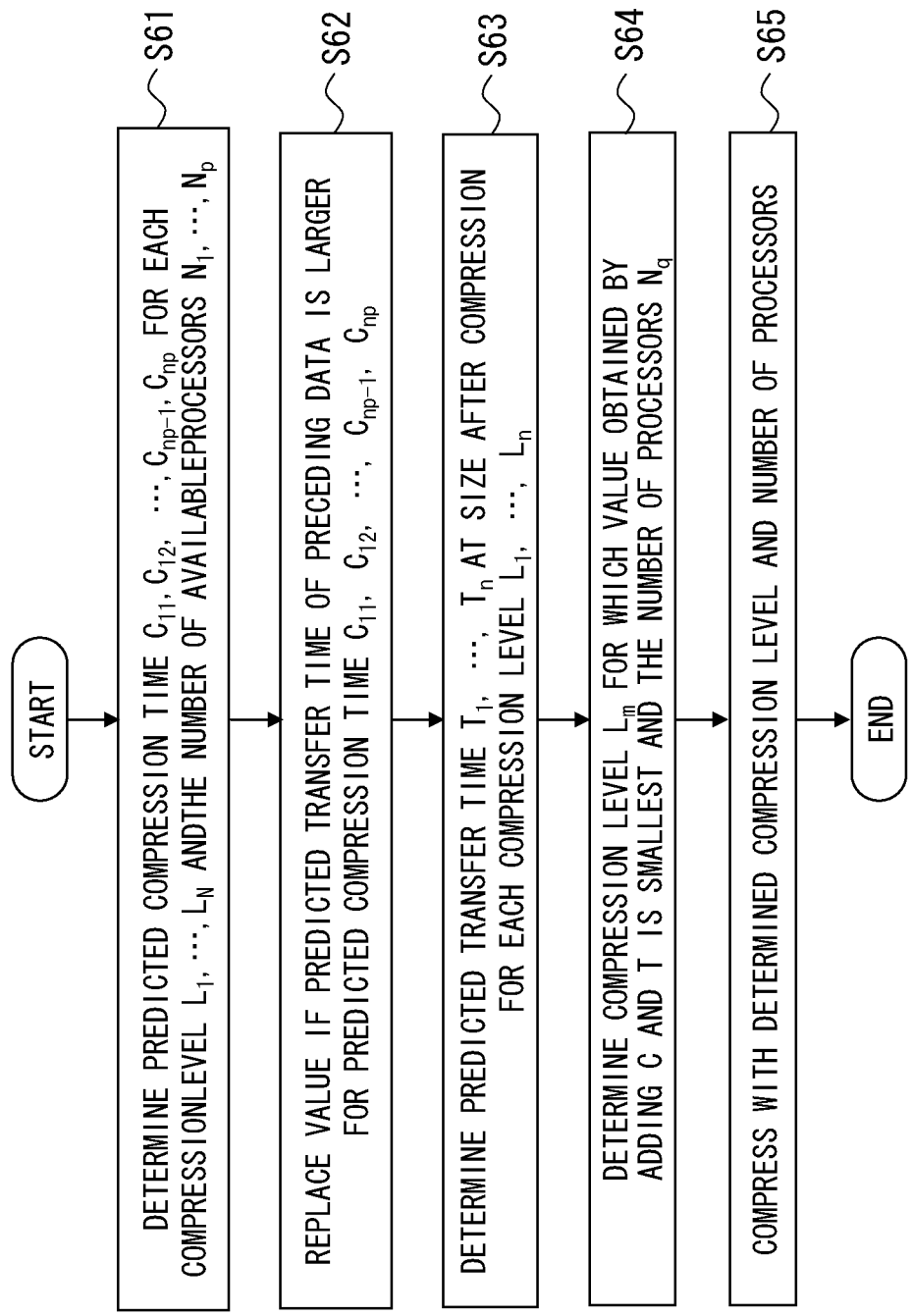
FIG. 18 is a flowchart illustrating determination processing procedure in a case where a plurality of processors exist.

Further, FIG. 18 is a flowchart illustrating determination processing procedure in the case where a plurality of processors exist. In the flowchart of FIG. 18, a compression information table shown in FIG. 13 is used.

The procedure proceeds to operation S61 of FIG. 18, where the prediction section 35 uses the compression information table of FIG. 13 to determine, for each combination of the compression levels L1, L2, L3, ..., Ln and the number of available processors N1, N2, N3, ..., Np, the predicted time (predicted compression time) C11, C12, ..., Cnp-1, Cnp required for the compression processing of the data to be transmitted.

The procedure proceeds to operation S62, where, if the predicted transfer time of the preceding data is larger for the predicted compression time C1, C2, C3, ..., Cn, the prediction section 35 replaces the predicted compression time C1, C2, C3, ..., Cn with the predicted transfer time of the preceding data. The processing of operation S62 addresses the fact that the transfer processing of the next data to be transmitted cannot be started if the transfer processing of the preceding data is not finished as shown in FIG. 4.

The procedure proceeds to operation S63, where the prediction section 35 uses the compression information table to determine, for the compression levels L1, L2, L3, ..., Ln, the predicted time (predicted transfer time) T1, T2, T3, ..., Tn required for the transfer processing at the size of the data after compression.

The procedure proceeds to operation S64, where the determination section 34 adds the predicted compression time C11, C12, ..., Cnp-1, Cnp and the predicted transfer time T1, T2, T3, ..., Tn, for each compression level, to determine a combination of the compression level Lm for which the added value is smallest and the number of processors Nq. The procedure proceeds to operation S65, where the compression section 32 compresses the data to be transmitted with the compression level Lm and the number of processors Nq determined by the determination section 34.

Therefore, the data transfer system of an embodiment efficiently parallelizes compression processing and transfer processing of data in the data transfer device 1 having a plurality of processors, thereby preventing the generation of wait time for these processes, and achieving acceleration of the transfer rate.

Figure 19:
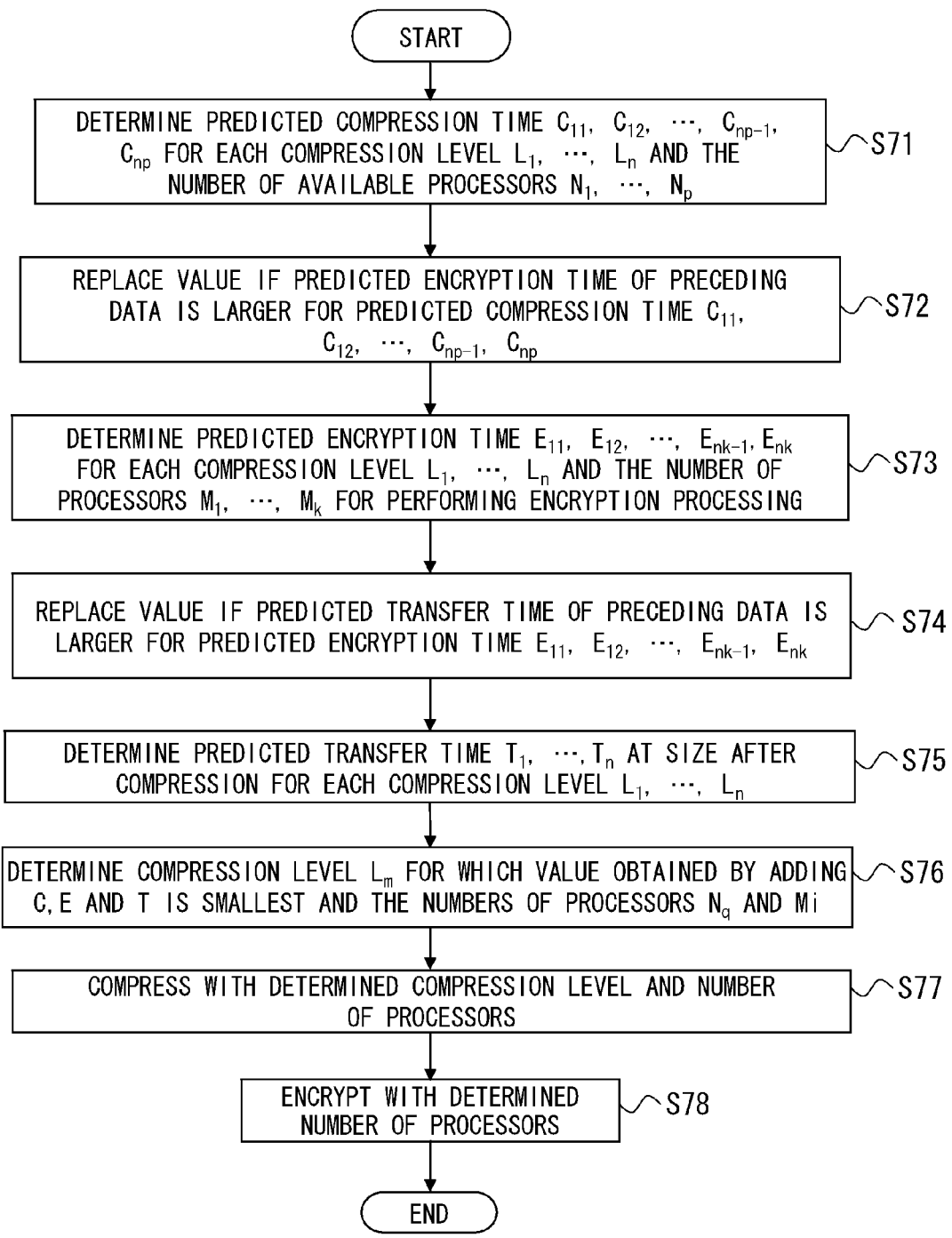
FIG. 19 is a flowchart illustrating determination processing procedure in a case where a plurality of processors exist and perform encryption.

Further, FIGS. 19 and 20 are flowcharts illustrating determination processing procedure in the case where a plurality of processors exist and perform encryption. In the flowcharts of FIGS. 19 and 20, a compression information table shown in FIG. 15 is used. FIG. 19 illustrates the determination processing procedure in the case where the second data is to be transmitted. FIG. 20 illustrates the determination processing procedure in the case where the third data is to be transmitted.

The procedure proceeds to operation S71 of FIG. 19, where the prediction section 35 uses the compression information table of FIG. 15 to determine, for each combination of the compression levels L1, L2, L3, ..., Ln and the number of available processors N1, N2, N3, ..., Np, the predicted time (predicted compression time) C11, C12, ..., Cnp-1, Cnp required for the compression processing of the data to be transmitted.

The procedure proceeds to operation S72, where, if the predicted encryption time of the preceding data is larger for the predicted compression time C1, C2, C3, ..., Cn, the prediction section 35 replaces the predicted compression time C1, C2, C3, ..., Cn with the predicted encryption time of the preceding data. The processing of operation S72 addresses the fact that the encryption processing of the next data to be transmitted cannot be started if the encryption processing of the preceding data is not finished as shown in FIG. 8.

Further, the procedure proceeds to operation S73, where the prediction section 35 uses the compression information table of FIG. 15 to determine, for each combination of the compression levels L1, L2, L3, ..., Ln and the number of processors M1, M2, M3, ..., Mk for performing encryption processing, the predicted time (predicted encryption time) E11, E12, ..., Enk-1, Enk required for the encryption processing of the data to be transmitted.

The procedure proceeds to operation S74, where, if the predicted transfer time of the preceding data is larger for the predicted encryption time E11, E12, ..., Enk-1, Enk, the prediction section 35 replaces the predicted encryption time E11, E12, ..., Enk-1, Enk with the predicted transfer time of the preceding data. The processing of operation S74 addresses the fact that the transfer processing of the next data to be transmitted cannot be started if the transfer processing of the preceding data is not finished as shown in FIG. 8.

The procedure proceeds to operation S75, where the prediction section 35 uses the compression information table to determine, for the compression levels L1, L2, L3, ..., Ln, the predicted time (predicted transfer time) T1, T2, T3, ..., Tn required for the transfer processing at the size of the data after compression.

The procedure proceeds to operation S76, where the determination section 34 adds the predicted compression time C11, C12, ..., Cnp-1, Cnp, the predicted encryption time E11, E12, ..., Enk-1, Enk and the predicted transfer time T1, T2, T3, ..., Tn, for each compression level, to determine a combination of the compression level Lm for which the added value is smallest and the numbers of processors Nq and Mi. The procedure proceeds to operation S77, where the compression section 32 compresses the data to be transmitted with the compression level Lm and the number of processors Nq determined by the determination section 34. The procedure proceeds to operation S78, where the compression section 32 encrypts the data to be transmitted with the number of processors Mi determined by the determination section 34.

The procedure proceeds to operation S81 of FIG. 20, where the prediction section 35 uses the compression information table of FIG. 15 to determine, for each combination of the compression levels L1, L2, L3, ..., Ln and the number of available processors N1, N2, N3, ..., Np, the predicted time (predicted compression time) C11, C12, ..., Cnp-1, Cnp required for the compression processing of the data to be transmitted.

The procedure proceeds to operation S82, where, if either of the predicted encryption time of the preceding data or the predicted transfer time of two data before is larger for the predicted compression time C1, C2, C3, ..., Cn, the prediction section 35 replaces the predicted compression time C1, C2, C3, ..., Cn with the longer of the predicted encryption time of the preceding data or the predicted transfer time of two data before. The processing of operation S72 addresses the fact that the encryption processing of the next data to be transmitted cannot be started if the encryption processing of the preceding data and the transfer processing of two data before are not finished as shown in FIG. 8.

Further, the procedure proceeds to operation S83, where the prediction section 35 uses the compression information table of FIG. 15 to determine, for each combination of the compression levels L1, L2, L3, ..., Ln and the number of processors M1, M2, M3, ..., Mk for performing encryption processing, the predicted time (predicted encryption time) E11, E12, ..., Enk-1, Enk required for the encryption processing of the data to be transmitted.

The procedure proceeds to operation S84, where, if the predicted transfer time of the preceding data is larger for the predicted encryption time E11, E12, ..., Enk-1, Enk, the prediction section 35 replaces the predicted encryption time E11, E12, ..., Enk-1, Enk with the predicted transfer time of the preceding data. The processing of operation S84 addresses the fact that the transfer processing of the next data to be transmitted cannot be started if the transfer processing of the preceding data is not finished as shown in FIG. 8.

The procedure proceeds to operation S85, where the prediction section 35 uses the compression information table to determine, for the compression levels L1, L2, L3, ..., Ln, the predicted time (predicted transfer time) T1, T2, T3, ..., Tn required for the transfer processing at the size of the data after compression.

The procedure proceeds to operation S86, where the determination section 34 adds the predicted compression time C11, C12, ..., Cnp-1, Cnp, the predicted encryption time E11, E12, ..., Enk-1, Enk and the predicted transfer time T1, T2, T3, ..., Tn, for each compression level, to determine a combination of the compression level Lm for which the added value is smallest and the numbers of processors Nq and Mi. The procedure proceeds to operation S87, where the compression section 32 compresses the data to be transmitted with the compression level Lm and the number of processors Nq determined by the determination section 34. The procedure proceeds to operation S88, where the compression section 32 encrypts the data to be transmitted with the number of processors Mi determined by the determination section 34.

Therefore, the data transfer system of an embodiment efficiently parallelizes compression processing, encryption processing and transfer processing of data in the data transfer device having a plurality of processors, thereby preventing the generation of wait time for these processes, and achieving acceleration of the transfer rate.

As described above, the data transfer device 1 of an embodiment performs compression processing, encryption processing and transfer processing in parallel, and changes a compression level (compression ratio) depending on the status of a line used for transfer. If there are a plurality of processors, the number of processors for performing compression processing and encryption processing is changed dynamically. By learning a compression time and compression ratio for each extension of a file (data) to be transmitted, an optimal compression level (compression ratio) may be determined.

For example, the data transfer device 1 according to an embodiment is constituted by one housing, but may be constituted by a plurality of housings. As a data transfer system in which the data transfer device 1 is constituted by a plurality of housings, one can be considered in which the storage section 31 storing data to be transmitted, and processing sections other than the storage section 31 are included in separate housings.

Alternatively, a configuration in which the data transfer device 1 and the data receiving device 2 of an embodiment are included in one housing can realize a device for transferring as well as receiving data.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention, the scope of which is defined in the claims and their equivalents.

What is claimed is:

1. A data transfer method, comprising:
    obtaining from a compression information database having a compression ratio, a compression speed of data and an encryption speed for each of a plurality of compression levels, a compression speed of the data for each of the compression levels, to calculate based on the compression speed of the data for each of the compression levels, a predicted time required for the compression of the data to be transferred for each of the compression levels;
    obtaining from the compression information database an encryption speed of data for each combination of the compression levels to calculate, based on the encryption speed obtained for each combination of the compression levels, a predicted time required for the encryption of the data to be transferred for each combination of the compression levels;
    obtaining from the compression information database, the compression ratio of the data for each of the compression levels, to calculate based on the compression ratio of the data for each of the compression levels, a predicted size after compression of the data to be transferred for each of the compression levels, and calculate a predicted time required for the transfer of the data for each of the compression levels;
    adding the predicted time required for the compression, the predicted time required for the transfer of the data for each of the compression levels and a predicted time required for the encryption of the data to determine a compression level for which the added predicted time is shortest;
    compressing the data to be transferred at the determined compression level;
    encrypting the data to be transferred; and
    transferring the compressed data to a transfer destination.

2. The data transfer method according to claim 1, comprising:
    comparing the predicted time required for the compression of the data to be transferred with a predicted time required for the transfer of the preceding data for each of the compression levels, and
    when the predicted time required for the transfer of the preceding data is larger than the predicted time required for the compression of the data to be transferred, the predicted time required for the compression of the data to be transferred is set as the predicted time required for the transfer of the preceding data.

3. The data transfer method according to claim 1 comprising:
    obtaining from a compression information database in which is registered a compression ratio of data and a compression speed depending on a number of processors performing compression processing for each of a plurality of compression levels, a compression speed of data for each combination of the compression levels and a number of processors, to calculate based on the compression speed obtained for each combination of the compression levels and the number of processors, a predicted time required for the compression of the data to be transferred for each combination of the compression levels and the number of processors,
    adding the predicted time required for the compression and the predicted time required for the transfer of the data for each combination of the compression levels and the number of processors to determine a combination of the compression level for which the added predicted time is shortest and the number of processors, and compressing the data to be transferred with the determined compression level and the determined number of processors.

4. The data transfer method according to claim 1 comprising:

comparing, for each combination of the compression levels and a number of processors, the predicted time required for the compression of the data to be transferred with the predicted time required for the transfer of the preceding data calculated for each combination of the compression levels and the number of processors, and when the predicted time required for the transfer of the preceding data is larger than the predicted time required for the compression of the data to be transferred, the predicted time required for the compression of the data to be transferred is set as the predicted time required for the transfer of the preceding data.

5. The data transfer method according to claim 1, wherein the compression information database registers a number of processors performing compression processing and encryption processing for each of a plurality of compression levels to calculate based on the encryption speed obtained for each combination of the compression levels and the number of processors, a predicted time required for the encryption of the data to be transferred for each combination of the compression levels and the number of processors.

6. The data transfer method according to claim 2, comprising:

comparing for each combination of the compression levels and a number of processors, the predicted time required for the encryption of the data to be transferred with the predicted time required for the transfer of the preceding data calculated for each combination of the compression levels and the number of processors; and setting the predicted time required for the encryption of the data to be transferred as the predicted time required for the transfer of the preceding data the predicted time required for the encryption of the data to be transferred when the predicted time required for the transfer of the preceding data is larger than the predicted time required for the encryption of the data to be transferred comparing, for each combination of the compression levels and the number of processors, the predicted time required for the compression of the data to be transferred, the predicted time required for the encryption of the preceding data and the predicted time required for the transfer of two data before calculated for each combination of the compression levels and the number of processors;

and setting the predicted time required for the compression of the data to be transferred as larger one of the predicted time required for the encryption of the preceding data or the predicted time required for the transfer of the two data before when the predicted time required for the encryption of the preceding data or the predicted time required for the transfer of the two data before is larger than the predicted time required for the compression of the data to be transferred.

7. The data transfer method according to claim 1, wherein the compression information database registers for each combination of a plurality of compression levels and a type of data to be transferred a compression ratio and a compression speed of data.

8. The data transfer method according to claim 1, wherein the compression information database reflects the compression ratio and the compression speed when the data to be transferred is actually compressed by the compression unit.

9. A computer-readable recording medium causing a computer to execute a data transfer method, the method comprising:

obtaining from a compression information database having a compression ratio, a compression speed of data and an encryption speed for each of a plurality of compression levels, a compression speed of the data for each of the compression levels, to calculate based on f the compression speed of the data for each of the compression levels, a predicted time required for the compression of the data to be transferred for each of the compression levels;

obtaining from the compression information database an encryption speed of data for each combination of the compression levels to calculate, based on the encryption speed obtained for each combination of the compression levels, a predicted time required for the encryption of the data to be transferred for each combination of the compression levels;

obtaining from the compression information database, the compression ratio of the data for each of the compression levels, to calculate based on the compression ratio of the data for each of the compression levels, a predicted size after compression of the data to be transferred for each of the compression levels, and calculate a predicted time required for the transfer of the data for each of the compression levels;

adding the predicted time required for the compression, the predicted time required for the transfer of the data and a predicted time required for the encryption of the data for each of the compression levels to determine a compression level for which the added predicted time is shortest;

compressing the data to be transferred at the determined compression level;

encrypts the data to be transferred; and transferring the compressed data to a transfer destination.

* * * * *

UNITED STATES PATENT AND TRADEMARK OFFICE
CERTIFICATE OF CORRECTION

PATENT NO. : 8,510,486 B2  
APPLICATION NO. : 12/622872  
DATED : August 13, 2013  
INVENTOR(S) : Hiroaki Kameyama et al.

It is certified that error appears in the above-identified patent and that said Letters Patent is hereby corrected as shown below:

On the Title Page, Item (30), In Column 1 (Foreign Application Priority Data), Line 1, Delete "Oct. 12, 2008" and insert -- Dec. 10, 2008 --, therefor.
On the Title Page, Item (57), In Column 2 (Abstract), Line 10, Delete "compressed" and insert -- compressed data --, therefor.

In the Claims
In Column 19, Line 37, In Claim 6, after "processors;" delete "and".
In Column 20, Line 27, In Claim 9, delete "on f the" and insert -- on the --, therefor.

Signed and Sealed this  
First Day of April, 2014

Michelle K. Lee  
*Deputy Director of the United States Patent and Trademark Office*